(12) United States Patent
Henderson et al.

(10) Patent No.: US 11,960,536 B2
(45) Date of Patent: Apr. 16, 2024

(54) METHODS AND SYSTEMS FOR ORGANIZING MUSIC TRACKS

(71) Applicant: Moodagent A/S, Copenhagen K (DK)

(72) Inventors: Mikael Henderson, Copenhagen K (DK); Peter Berg Steffensen, Copenhagen K (DK); David Stubbe Teglbjærg, Copenhagen K (DK); Jesper Steen Andersen, Copenhagen K (DK); Jose Luis Diez Antich, Copenhagen K (DK); Thomas Jørgensen, Copenhagen K (DK)

(73) Assignee: Moodagent A/S, Copenhagen K (DK)

( * ) Notice: Subject to any disclaimer, the term of this patent is extended or adjusted under 35 U.S.C. 154(b) by 61 days.

(21) Appl. No.: 17/764,603

(22) PCT Filed: Sep. 30, 2020

(86) PCT No.: PCT/EP2020/077377
§ 371 (c)(1),
(2) Date: Mar. 29, 2022

(87) PCT Pub. No.: WO2021/064026
PCT Pub. Date: Apr. 8, 2021

(65) Prior Publication Data
US 2022/0350838 A1    Nov. 3, 2022

(30) Foreign Application Priority Data
Sep. 30, 2019   (EP) ..................................... 19200375

(51) Int. Cl.
*G06F 17/00* (2019.01)
*G06F 16/638* (2019.01)
(Continued)

(52) U.S. Cl.
CPC .......... *G06F 16/639* (2019.01); *G06F 16/683* (2019.01); *G06F 16/686* (2019.01); *G10L 15/22* (2013.01)

(58) Field of Classification Search
CPC .... G06F 16/639; G06F 16/683; G06F 16/686; G06F 16/68; G10L 15/22
See application file for complete search history.

(56) References Cited

U.S. PATENT DOCUMENTS

| 10,055,493 B2* | 8/2018 | Heitz, III | G06F 16/683 |
| 2003/0135513 A1* | 7/2003 | Quinn | G11B 27/105 |
| | | | 707/999.102 |

(Continued)

FOREIGN PATENT DOCUMENTS

EP    2410444 A2    1/2012

OTHER PUBLICATIONS

Jaehun Kim et al., Towards Seed-Free Music Playlist Generation: Enhancing Collaborative Filtering with Playlist Title Information. In Proceedings of the ACM Recommender Systems Challenge, Asso. for Computing Machinery, Article 14, 1-6, <https://doi.org/10.1145/3267471.3267485>, Oct. 2018.*

(Continued)

*Primary Examiner* — Greta L Robinson
(74) *Attorney, Agent, or Firm* — Nordic Patent Service

(57) ABSTRACT

A method, device and system for organizing media content on a computer-based system to form a playlist, wherein the device has access to a database with a plurality of music tracks and associated feature vectors including feature values representing different semantic characteristics of a music track, as well as metadata including at least one type of metadata record representing associated information about the respective music track. The playlist is determined based on a query from the client device that includes an input (Continued)

vector, and at least one input metadata record, using an additional similarity matrix representing a measure of similarity between different metadata records of the same type.

20 Claims, 7 Drawing Sheets

(51) Int. Cl.
 *G06F 16/68* (2019.01)
 *G06F 16/683* (2019.01)
 *G10L 15/22* (2006.01)

(56) References Cited

U.S. PATENT DOCUMENTS

| | | | |
|---|---|---|---|
| 2009/0012635 A1 | 1/2009 | Hicken et al. | |
| 2018/0322195 A1* | 11/2018 | Lee | G06F 16/637 |
| 2019/0294690 A1 | 9/2019 | Pastor et al. | |

OTHER PUBLICATIONS

Markus Schedl et al., Mobile Music Genius: Reggae at the Beach, Metal on a Friday Night? In Proceedings of International Conference on Multimedia Retrieval, Asso. for Computing Machinery, 507-510. <https://doi.org/10.1145/2578726>, Apr. 2014.*
International Search Report, European Patent Office, Application No. PCT/EP2020/077377, dated Nov. 5, 2020, 3 pages.

* cited by examiner

METHODS AND SYSTEMS FOR ORGANIZING MUSIC TRACKS

TECHNICAL FIELD

The disclosure relates to analyzing audio data, such as music files. In particular, the embodiments described herein relate to methods and systems for organizing music tracks into a playlist.

BACKGROUND

As computer technology has improved, the digital media industry has evolved greatly in recent years. Users are able to use electronic devices such as mobile communication devices (e.g., cellular telephones, smartphones, tablet computers, etc.) to consume music, video and other forms of media content. At the same time, advances in network technology have increased the speed and reliability with which information can be transmitted over computer networks. It is therefore possible for users to stream media content over computer networks as needed, or on demand, rather than receiving a complete file (on a physical CD, DVD, or downloading the entire file).

Online music streaming services exploit these possibilities by allowing users to browse large collections of music tracks using their electronic devices. As a result, online users today face a daunting volume of content and choosing from this enormous volume of content can be challenging. There is therefore an increasing demand from users to be able to quickly find an integral list of music tracks on streaming services that are the most relevant to them based on their user profile and other circumstances (current activity, mood, location, social circles) and to be able to quickly and easily adjust the list to enhance the results.

One way to offer relevant content for users is using automatic media recommendation systems which rank and suggest the most interesting content items based on user preferences, thus saving the users from manually filtering out any uninteresting or unrelated content.

The problem with this approach is that the user preferences are defined mostly based on statistical analysis of the service usage and interactions of the users and their social circles (using e.g. Collaborative Filtering), and therefore the recommendations are based on each item as a catalogue entity (e.g. a file in a database), not taking into account its internal (semantic) properties. Furthermore, when users first start to use a service they will have no information that could be extracted from their profiles regarding their interests, and even later on the gathered information can be incomplete, inaccurate, or in other ways misleading, thus resulting in recommendations that users will find useless or even annoying.

Another approach is to offer a selection of items (e.g. in the form of a playlist) based on similarities between a larger group of items and a seed item selected either manually by the user or automatically by a computer-based system. The similarities between these items can be determined based on direct similarities between their content (e.g. their digital audio signals), or indirect similarities between their associated metadata (e.g. artist name, artist's overall musical genre).

One problem with determining direct similarities between digital audio signals is that it requires a massive storage capacity for storing the digital signals in the form of electronic files, and a significant amount of computing power to analyze all the files. In the case of music streaming services with continuously updated catalogues of hundreds of millions of music tracks this presents huge costs and regular problems with the maintenance of hardware elements and optimization of software for the continuously growing scale of databases. In addition, due to copyright regulations or other legal restrictions, media streaming services may not have the rights to store the original digital audio signals on their servers.

The problem on the other hand with determining indirect similarities between associated metadata is that, although it requires much less storage capacity and computing power to analyze, the metadata is usually very limited and thus cannot represent the rich semantic and musical nuances of media items. Furthermore, this stored information is solely based on extrinsic or predefined data (such as the track title, artist name, album name, track number, and release date) and nothing on the substance of the music tracks. In some cases, the musical genre is also stored, however this genre is usually assigned manually by an industry professional for an entire album (or even entire catalogue of a certain artist) and therefore fails to truthfully represent the actual musical genre of individual music tracks.

A slightly improved solution for determining media similarities is to analyze the digital audio signals of music files to extract compact-sized feature vectors representing different semantic characteristics of the music tracks. These feature vectors may comprise low-level acoustic information representing the temporal, spectral (timbral), harmonic, or energy features of a music track and/or high-level acoustic information representing its musical or emotional values. The feature vectors can then be used as basis for a more sophisticated, and less storage-heavy automatic comparison of music tracks. However, simply using these feature vectors for similarity analysis and playlist generation for a given seed track may return lots of unwanted or irrelevant results, or music tracks that would make sense in certain situations (special occasions such as birthdays or holidays, or in a religious context) but would need to be excluded in other occasions.

Furthermore, the end users of these services often have an unspecific wish for hearing a particular type of music that fits well with an existing selection of music track(s) and/or the end user's context, which may include current mood (e.g. happy, sad, angry, sensual) or other circumstances (e.g. specific location, workout, commute, relaxing). However, translating such a context of a user to create a new playlist or adjust an existing playlist dynamically using the usually limited time and input capabilities of client devices is a difficult technical problem.

SUMMARY

It is an object to provide a method and system for efficiently organizing music tracks, based on limited user input, into a playlist that accurately reflects context of a user as well as similarities in content and context between music tracks, and thereby solving or at least reducing the problems mentioned above.

The foregoing and other objects are achieved by the features of the independent claims. Further implementation forms are apparent from the dependent claims, the description and the figures.

According to a first aspect, there is provided computer-implemented method for organizing music tracks into a playlist, the method comprising:

providing a client device, and a storage device in data connection with the client device;

providing, on the storage device, a plurality of music tracks, each music tracks having linked therewith a feature vector and metadata, wherein the feature vector comprises feature values representing semantic characteristics of the respective music track, and the metadata comprises at least one type of metadata record representing associated information about the respective music track;

providing a similarity matrix, the values of the similarity matrix representing a measure of similarity between different metadata records of the same type;

receiving a query from the client device comprising an input vector, and at least one input metadata record;

selecting an ordered set of music tracks from the storage device by determining a number $n_m$ of similar metadata records with respect to the input metadata record using the similarity matrix;

determining a qualified tracks pool comprising, for each similar metadata record, a number $n_q$ of qualified music tracks from the storage device which comprise the respective similar metadata record in their metadata;

determining an order of music tracks within the qualified tracks pool based at least in part on a distance between the whole or part of the feature vector of each qualified music track with respect to the input vector in the vector space; and returning to the client device, as a reply to the query, a playlist based on the ordered set of music tracks.

With this method it becomes possible to quickly and accurately organize from a remote client device, using a simple user input, a large and continuously growing database of music tracks on a server into a compact, dynamic playlist that accurately and objectively reflects a context of a user as well as similarities in content and context between music tracks (based on associated semantic data, metadata, and further objective data such as user profiles based on measured activity and social relationships).

Thus, the method greatly improves searchability and navigability of a large, remote, dynamically changing database (by making it easier to find both similar and alternative music tracks), while also improving catalogue utility (by natural inclusion and extension into deeper and wider parts of a catalogue, incl. analysing and matching new releases instantly and surfacing previously undiscovered back-catalogue items).

Providing a simple input method that allows quick and responsive creation and adjustment of playlist greatly improves interactivity and flexibility, while having both input metadata and input vector in the query allows for improved input complexity (e.g. combining mood-related sliders with seed tracks and further flavours) and the ability to save these input combinations as separate entities for later re-use or to be shared between users to create dynamic playlists that can be applied to the same or different databases of music tracks.

The use of compact-sized metadata and feature vectors for associated calculations ensures efficient data usage when communicating between a server (of a streaming service provider) and a client device (smartphone with a streaming application), thereby achieving savings on both costs, response time, and network load. The latter may become especially relevant when mobile networks are being used for data communication between a server and a client device. The combination with the above input and an additional, pre-generated similarity matrix that describes metadata similarities adds a further layer of accuracy for the resulting playlist, and highly improves calculation efficiency on the server by reducing the pool of tracks to an efficiently manageable size before analyzing the feature vectors and calculating vector distances.

The use of an input vector in the query from the device further simplifies calculations and data efficiency when communicating with a (streaming) server.

In an embodiment the plurality of music tracks can be organized in a database stored on the storage device.

In an embodiment the number $n_m$ of similar metadata records is $n_m \le 1000$, more preferably $1 \le n_m \le 100$, most preferably $n_m = 50$.

In an embodiment the number $n_q$ of qualified music tracks for each similar metadata record is $1 \le n_q \le 1000$, more preferably $1 \le n_q \le 500$, most preferably $n_q = 100$.

In an embodiment the number $N_p$ of music tracks in the playlist is $1 \le N_p \le 100$, more preferably $1 \le N_p \le 50$, most preferably $N_p = 25$.

In an embodiment the number $n_f$ of feature values is $1 \le n_f \le 256$, more preferably $1 \le n_f \le 100$, more preferably $1 \le n_f \le 34$; wherein each of the feature values of the feature vectors and input values of the input vector is preferably an integer number, more preferably a positive integer number, most preferably a positive integer number with a value ranging from 1 to 7.

The inventors arrived at the insight that selecting the number of feature values and their numerical value from within these ranges ensures that the data used for further processing is sufficiently detailed while also compact in data size in order to allow for efficient processing.

In an embodiment the semantic characteristic represented by a feature value is one of a perceived musical characteristic corresponding to the style, genre, sub-genre, rhythm, tempo, vocals, or instrumentation of the respective media content item;

a perceived emotional characteristic corresponding to the mood of the respective media content item; or an associated characteristic corresponding to metadata, online editorial data, geographical data, popularity, or trending score associated with the respective media content item.

Providing feature vectors comprising such feature values that numerically represent these musical, emotional, and other associated characteristics enables a complex representation of these media content items while still having an efficiently small data size. Calculating similarity using these feature vectors enables efficient processing without sacrificing the accuracy or relevancy of results.

In a possible implementation form of the first aspect the metadata records comprise tags such as language, release year, ceremonial, seasonal, explicit, remix, live, karaoke, cover, non-music, or flagged; and selecting the ordered set of music tracks further comprises:

applying, if applicable, at least one pre-order rule, before determining the order of the music tracks, in order to remove music tracks whose metadata records comprise a tag blacklisted in the pre-order rule, or remove music tracks whose metadata records do not comprise a tag whitelisted in the pre-order rule, or add music tracks from the storage device whose metadata records comprise a tag whitelisted in the pre-order rule, or adjust the qualified tracks pool according to a pre-order rule based on other metadata, removing a recurring title, or adding music tracks comprising the input metadata record; and applying, if applicable, at least one post-order rule to adjust the order of the music tracks based on their metadata.

Applying further tag-based or metadata-based arrangement rules before and/or after ordering the tracks further ensures that irrelevant or out-of-context tracks (such as Christmas songs in the summer, or religious/ceremonial tracks at a house party) are removed from the mix (and thus from the final playlist), while also makes it possible to include tracks from the storage device that would be relevant in the playlist based on the input information but did not end up in the pool based on just their metadata (such as tracks featured in the same movie, or Christmas tracks when it is in fact Christmas).

In a further possible implementation form of the first aspect determining the degree of similarity between different metadata records for creating the similarity matrix is based on at least one of:
  distance between feature vectors of all music tracks which have the respective metadata record in their metadata;
  degree of similarity between user IDs linked with the respective metadata records, wherein user ID similarity is determined based on the similarity between music tracks linked with the respective user IDs, and wherein the links between user IDs and music tracks are determined based on recorded user interactions with music tracks on a client device;
  social relationships between user IDs linked with the respective metadata records;
  the co-presence of the respective metadata records and at least one of certain predefined tags in the metadata of any music tracks; or
  the co-presence of the respective metadata records and at least one further, identical metadata record in the metadata of any music tracks.

Using these factors for determining the metadata similarities provides an additional degree of freedom and complexity when designing the flow of playlist generation, while also further improving accuracy and relevancy for the end user.

In a further possible implementation form of the first aspect the method further comprises:
  receiving, on the remote server, a playlist extension query from the client device;
  selecting, on the remote server, an additional ordered set of music tracks from the qualified tracks pool based at least in part on the order, wherein the additional ordered set comprises music tracks that were not fully included in a previous ordered set;
  re-ordering the additional ordered set, if necessary, to ensure that no previous order is repeated; and
  returning to the client device, as a reply to the playlist extension query, an extended playlist based on a previously returned playlist and the additional ordered set of music tracks.

These additional steps enable the user to extend the playlist based on the same input information, so that more tracks are presented that are similarly relevant for both the current mood and other input information (such as a seed track or flavour).

In a further possible implementation form of the first aspect the method further comprises:
  receiving, on the remote server, a playlist refresh query from the client device;
  selecting, on the remote server, a new ordered set of music tracks from the qualified tracks pool based at least in part on the order, wherein the new ordered set differs at least in part from any previous ordered set; and
  returning, as a reply to the playlist refresh query, a refreshed playlist based on the new ordered set of music tracks.

These additional steps enable the user to refresh the playlist to get a new set of tracks based on the same input information.

In a further possible implementation form of the first aspect the query comprises reference to a seed music track from within the plurality of music tracks, the input values of the input vector are determined based on the feature values of the feature vector of the seed music track; and the input metadata record is determined based on the metadata of the seed music track.

Using a seed track as input information enables a very simple and user-friendly input for determining the playlist. The playlist will reflect the seed track with high accuracy, but the method also ensures the possibility to factor in further inputs (such as current mood, etc.).

In a further possible implementation form of the first aspect the query comprises references to a plurality $n_s$ of seed music tracks arranged in an order of priority, and wherein
  determining the similar metadata records comprises determining, for each seed music track, a number $n_m$ of similar seed metadata records with respect to their respective input metadata record using the similarity matrix Ms;
  determining the qualified tracks pool comprises creating a seed track pool for each seed music track comprising, for each similar seed metadata record, a number $n_q$ of music tracks from the storage device which comprise the similar seed metadata record in their metadata; and
  determining the order of music tracks comprises creating a number $n_s$ of master lists by sorting the music tracks from the highest priority seed track pool based on their feature vector distances from each seed music track in descending priority order;
  creating a number $n_s-1$ of secondary lists by sorting the music tracks from each of the remaining seed track pool in descending priority order based on their feature vector distances from the first seed music track; and
  creating a combined list by concatenating the first music tracks of each master list in descending order followed by the first music tracks of each secondary list in descending order, followed by the consecutive music tracks from each list in a similar fashion.

Using multiple seed tracks further improves complexity and accuracy of the resulting playlist, while still keeping the input user-friendly and efficient. The method of prioritizing seed racks and generating a combined list as described above ensures that the most relevant tracks end up high on the list of the final playlist.

In an embodiment the number $n_s$ of seed music tracks is $1 < n_s \leq 10$, more preferably $1 < n_s \leq 5$.

In an embodiment the number $n_m$ of similar seed metadata records is $1 \leq n_m \leq 1000$, more preferably $1 \leq n_m \leq 100$, most preferably $n_m = 50$.

In an embodiment the number $n_q$ of music tracks for each similar seed metadata record is $1 \leq n_q \leq 1000$, more preferably $1 \leq n_q \leq 500$, most preferably $n_q = 100$.

In a further possible implementation form of the first aspect seed music track is determined by:
  creating a starter pool within the plurality of music tracks, wherein the seed music track is selected from the starter pool, and wherein the starter pool comprises music tracks based on at least one of
    a predetermined user taste profile with music tracks on the client device, such as liking, skipping, repeating, rewinding, or adding to a playlist),
    a list of currently trending music tracks or artists, current date or time of the client device, or current location of the client device.

The additional step of creating a starter pool based on the above factors enhances relevancy of the final playlist for the user, while also enabling taking into account current trends and listening circumstances (such as time of day, or day of the week).

In a further possible implementation form of the first aspect the input values of the input vector are determined by providing, on a GUI, at least one gradual adjustment element movable between two end positions, the gradual adjustment element(s) graphically representing a variable associated with at least one input value of the input vector;

wherein the position of a gradual adjustment element relative to its end positions represents the value of the variable;

detecting a user interaction with at least one of the gradual adjustment elements resulting in moving the gradual adjustment element to a new position, and determining the input values of the input vector based on the new value of the variable(s) affected by the user interaction; wherein the gradual adjustment elements comprise at least one of
a—slider movable by dragging between two end points along a vertical or horizontal axis, or
a rotatable knob movable by rotating clockwise or counter-clockwise between two extreme positions.

Using gradual adjustment elements such as sliders and knobs provides an efficient, simple and user-friendly way of adjusting variable values, and ultimately the resulting playlist.

In a further possible implementation form of the first aspect receiving the query comprises:

providing, on a GUI, at least one flavour element, the flavour element(s) having associated therewith at least one input vector and a reference to at least one metadata record in the similarity matrix; wherein the flavour element is one of a textual reference to a metadata record;
a graphical or textual reference to a user ID;
a graphical reference to a location; or
a textual reference indirectly associated with at least one of the plurality of music tracks.

Adding the option to select flavour element on the GUI provides further complexity, while still keeping the GUI relatively simple and intuitive. Adding the above options of flavour elements on the GUI provides users with the ability to customize a playlist according to certain requirements that would not be possible by using previously available methods (or by using previously mentioned GUI elements) such as specifying a certain location, or a title of a movie, and applying these criteria to the dynamically generated playlist.

In a further possible implementation form of the first aspect the seed music track is selected from a starter pool, the starter pool being determined based on the distances between the feature vector of each music tracks of the starter pool with respect to the input vector associated with at least one of the flavour elements.

This aspect enables the efficient combination of both seed track(s) and flavours, optionally with further input from gradual adjustment elements reflecting current mood of the user, as input information for dynamically generating the playlist.

In a further possible implementation form of the first aspect any method step that results in a different set of music tracks than its preceding method step further involves a feedback loop to the step of determining the number $n_m$ of similar metadata records, wherein in case the number N of music tracks in the resulting different set doesn't meet a threshold $N_t$, a different number $n_{s+1}$ of similar metadata records is determined, and the subsequent method steps are repeated in an iterative manner until the threshold is met. The predefined track number threshold and feedback loops after each step ensure that there is always a sufficient number of tracks in the track pool to use for a subsequent arrangement or calculation step, and the iteration provides a way to control the end result in an automated manner.

In an embodiment the threshold $N_t$ of music tracks to compare to the number N of music tracks in a resulting set is $N_t=5,000$.

The inventors arrived at the insight that the use of a track number threshold within these ranges provides the best results for data processing and efficiency.

In a further possible implementation form of the first aspect the metadata comprises the artist of the respective music track;

the similarity matrix comprises information about similarity between artists;

the query comprises reference to a seed artist;

determining the number of similar metadata records comprises determining a number $n_m$ of most similar artists with respect to the seed artist; and the qualified tracks pool comprises a number $n_q$ of qualified music tracks from each of the number $n_m$ of most similar artists.

This specific implementation enables using a metadata record (artist) that is almost always present in associated metadata of a music track, thus enabling sufficient numbers of rack pools and thus great variation of tracks throughout the method steps, resulting in an optimal final playlist.

In an embodiment the number $n_m$ of most similar artists is $1 \leq n_m \leq 1000$, more preferably $1 \leq n_m \leq 100$, most preferably $n_m=50$.

In a further possible implementation form of the first aspect the storage device is provided on a remote server in data connection with the client device, the remote server being further configured to receive query from the client device, select an ordered set of music tracks from the storage device, and return to the client device, as a reply to the query, a playlist based on the ordered set of music tracks.

According to a second aspect, there is provided a computer-implemented method for organizing music tracks into a playlist, the method comprising:

providing a client device, and a storage device in data connection with the client device;

providing, on the storage device, a plurality of music tracks, each music track having linked therewith a feature vector, wherein the feature vector comprises feature values representing semantic characteristics of the respective music track;

receiving, from the client device, a query comprising natural language-based input;

analyzing the natural language-based input using a natural language processing algorithm to extract at least one keyword;

calculating an input vector by mapping the at least one keyword to a set of input values;

selecting an ordered set of music tracks from the storage device by determining a qualified tracks pool comprising a number $n_q$ of qualified music tracks from the storage device based on matching with the query;

determining an order of music tracks within the qualified tracks pool based at least in part on a distance between the whole or part of the feature vector of each qualified music track with respect to the input vector in the vector space; and returning to the client device, as a reply to the query, a playlist based on the ordered set of music tracks.

With this alternative method it becomes possible to use a simple natural language-based (e.g. spoken word) user input from a remote client device to organize a large and continuously growing database of music tracks on a server into a compact, dynamic playlist that accurately and objectively reflects a context of a user as well as similarities in content and context between music tracks.

The use of compact-sized feature vectors for associated calculations ensures efficient data usage when communicating between a server (of a streaming service provider) and a client device (smartphone with a streaming application), thereby achieving savings on both costs, response time, and network load. The latter may become especially relevant when mobile networks are being used for data communication between a server and a client device.

The use of an input vector in the query from the device further simplifies calculations and data efficiency when communicating with a (streaming) server.

In a possible implementation form of the second aspect mapping the at least one keyword to a set of input values comprises applying a machine learning-based semantic algorithm trained to predict a relevance of a set of semantic characteristics for a given keyword in the form of input values.

In a further possible implementation form of the second aspect mapping the at least one keyword to a set of input values comprises applying a semantic matrix defining logical relationships between a set of keywords and a corresponding set of semantic characteristics, wherein the respective values of the semantic matrix are selected as input values for a given keyword.

In a further possible implementation form of the second aspect the natural language-based input comprises speech input; and wherein the method further comprises initiating audio playback, on the client device, of one of the music tracks from the playlist in response to the query.

Providing a natural language-based speech input combined with audio playback allows quick and responsive creation and adjustment of a playlist without the need of a visual user interface, which in turn greatly improves accessibility as well as interactivity and flexibility.

In a further possible implementation form of the second aspect the storage device further comprises metadata linked with each music track, the metadata comprising at least one type of metadata record representing associated information about the respective music track;

wherein the method further comprises analyzing the natural language-based input using a natural language processing algorithm to extract at least one reference to an input metadata record;

providing a similarity matrix, the values of the similarity matrix representing a measure of similarity between different metadata records of the same type; and determining a number $n_m$ of similar metadata records with respect to the input metadata record using the similarity matrix; and wherein determining the qualified tracks pool is based on selecting, for each similar metadata record, a number $n_q$ of qualified music tracks from the storage device which comprise the respective similar metadata record in their metadata.

Having both input metadata and input vector in the query allows for improved input complexity (e.g. combining mood-related sliders with seed tracks and further flavours) and the ability to save these input combinations as separate entities for later re-use or to be shared between users to create dynamic playlists that can be applied to the same or different databases of music tracks.

The combination of the above input and an additional, pre-generated similarity matrix that describes metadata similarities adds a further layer of accuracy for the resulting playlist, and highly improves calculation efficiency on the server by reducing the pool of tracks to an efficiently manageable size before analyzing the feature vectors and calculating vector distances.

In a further possible implementation form of the second aspect the storage device is provided on a remote server in data connection with the client device, the remote server being further configured to receive query from the client device, select an ordered set of music tracks from the storage device, and return to the client device, as a reply to the query, a playlist based on the ordered set of music tracks.

According to a third aspect, there is provided a system for organizing music tracks into a playlist, the system comprising:

a client device;

a remote server in data connection with the client device, the server comprising a machine-readable storage device including a program product and configured to store a plurality of music tracks and a feature vector and metadata linked to each music track;

the client device comprising at least one processor and at least one of a GUI or audio interface controlled by the at least one processor and configured to receive a query from a user;

the server further comprising one or more processors operable to execute the program product, interact with the client device, and perform operations according to the methods of any one of the possible implementation forms of the first aspect; wherein the GUI and/or the audio interface is further configured to, as a reply to the query, either show to the user a playlist of music tracks, or initiate audio playback of one of the music tracks from the playlist determined by executing the steps of the method.

Providing such a computer-based system comprising both a client and a server device as described, in data communication with each other, whereby the database of music tracks and their associated feature vectors and metadata, as well as the similarity information of metadata records in the form of a similarity matrix are provided on the server enables an efficient and controlled operation of the whole system in order to increase the accuracy of the determined playlist and to conserve power and increase usage time of the client device, while reducing data communication load and response times between the client device and server.

In an embodiment the plurality of music tracks can be organized in a database stored on the storage device.

According to a fourth aspect, there is provided a computer program product, encoded on a computer-readable storage medium, operable to cause a data processing apparatus to perform operations according to the methods of any one of the possible implementation forms of the first aspect.

Providing instructions in the form of a computer program product on a computer-readable storage medium enables users to download such instructions to their client device and achieve the advantages listed above without the need for any hardware upgrade of their device.

These and other aspects will be apparent from and the embodiment(s) described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION

Figure 1:
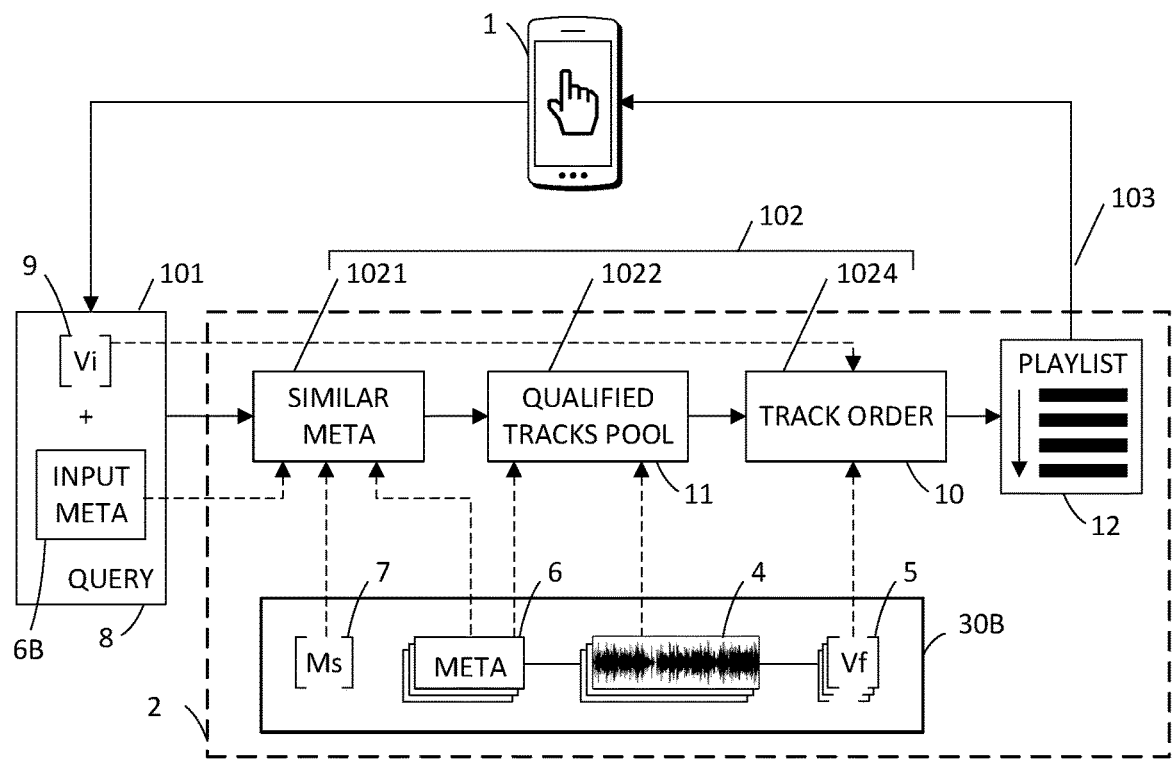
FIG. 1 shows a flow diagram of a method for organizing music tracks into a playlist in accordance with the first aspect, using a system in accordance with the second aspect.
Figure 14:
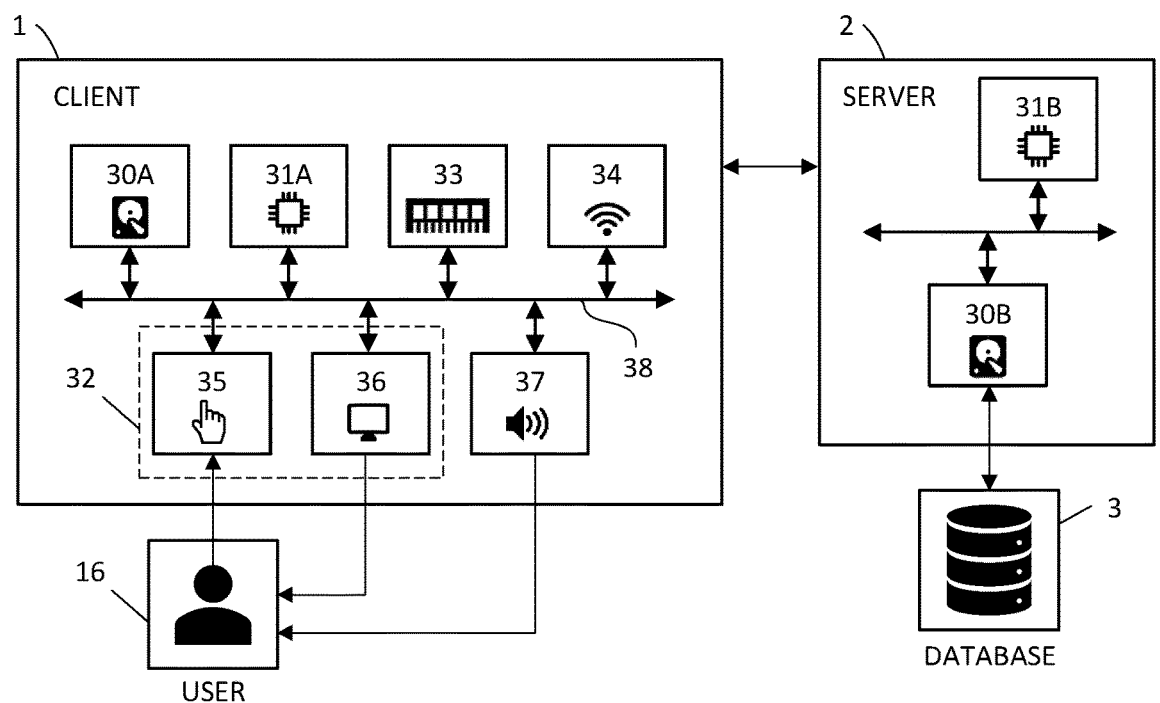
FIG. 14 shows a block diagram of a system in accordance with a possible implementation form of the third aspect.

FIG. 1 shows a flow diagram of a method for organizing music tracks into a playlist in accordance with the present disclosure, using a computer-based system such as for example the system shown on FIG. 14.

According to an implementation, a client device 1 and a remote server 2 is provided in data connection with each other. In some embodiments, the client device 1 is a desktop computer.

In some embodiments, the client device 1 is portable (such as e.g. a notebook computer, tablet computer, or handheld device). In some embodiments, the client device 1 is user-wearable. The remote server 2 may include any suitable types of servers that are configured to store and provide data to a client device 1 remotely (e.g., file server, database server, web server, or media server).

Accordingly, a storage device 30B comprising a plurality of music tracks 4 is also provided on the remote server 2, each music track 4 having linked therewith a feature vector 5 and metadata 6. In an embodiment, the plurality of music tracks 4 and their associated feature vector 5 and metadata 6 may be organized in a database 3 stored on the storage device 30B.

In a further possible embodiment, the music tracks 4 and their associated feature vector 5 and metadata 6 may be stored on a storage device 30A of the client device 1, and may be organized in a database 3 stored on the storage device 30A.

In the present context, 'music track' refers first and foremost to any musical composition (song or instrumental piece) that has been recorded as or converted into digital form to be stored on a digital storage device. Thus, each music track 4 can be provided in the form of a digital audio signal stored as an audio file on a storage medium 30 of computer-based system such as the one illustrated in FIG. 14. In further possible implementations 'music track' may refer to any type of recorded audio signal (such as recorded speech, full-length audio track of a video, etc.).

In a possible embodiment, the duration of the music track 4 is shorter than that of the original musical composition, ranging from is to 60 s, more preferably from 5 s to 30 s. In a preferred embodiment, the duration of a music track 4 is 15 s.

In an embodiment, the music track 4 is a representative segment, or a combination of representative segments, that have been extracted from the original musical composition.

Figure 3:
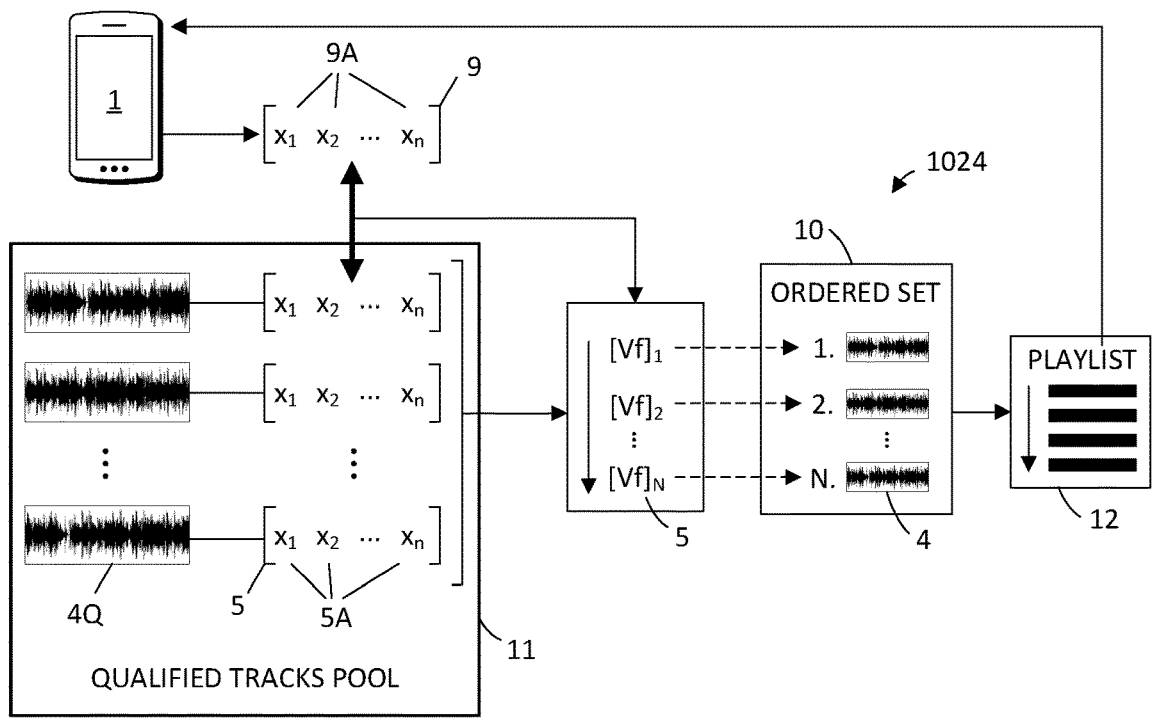
FIG. 3 shows a flow diagram of determining an order of music tracks within a qualified tracks pool in accordance with a possible implementation form of the first aspect.

In the present context, a 'vector' is meant to be interpreted in a broad sense, simply defining an entity comprising a plurality of values in a specific order or arrangement. Accordingly, each feature vector 5 comprises feature values 5A (as illustrated in FIG. 3) representing semantic characteristics of the respective music track 4.

In the context of the present disclosure, 'semantic' refers to the broader meaning of the term used in relation to data models in software engineering describing the meaning of instances. A semantic data model in this interpretation is an abstraction that defines how stored symbols (the instance data) relate to the real world, and includes the capability to express information that enables parties to the information exchange to interpret meaning (semantics) from the instances, without the need to know the meta-model itself. Thus, the feature vector 5 comprising 'feature values 5A representing semantic characteristics' refers to efficiently sized digital information (numerical values) suitable for expressing relations to high-level concepts (meaning) in the real world (e.g. musical and emotional characteristics) and providing means to compare associated objects (music tracks) without the need to know what high-level concept each feature value 5A exactly represents.

In a possible embodiment a feature value 5A may represent a perceived musical characteristic corresponding to the style, genre, sub-genre, rhythm, tempo, vocals, or instrumentation of the respective music track 4; or a perceived emotional characteristic corresponding to the mood of the respective music track 4; or an associated characteristic corresponding to online editorial data, geographical data, popularity, or trending score associated with the respective music track 4. In an embodiment the number of feature values 5A ranges from 1 to 256, more preferably from 1 to 100, more preferably from 1 to 34.

In a preferred embodiment each feature vector 5 consists of 34 feature values 5A corresponding to individual musical qualities of the respective music track 4. Each of these feature values 5A can take a discrete value from 1 to 7, indicating the degree of intensity of a specific feature, whereby the value 7 represents the maximum intensity and the value 1 represents the absence of that feature in the musical segment. The 34 feature values 5A in this exemplary embodiment correspond to a number of moods (such as 'Angry', 'Joy', or 'Sad'), a number of musical genres (such as 'Jazz', 'Folk', or 'Pop'), and a number of stylistic features (such as 'Beat Type', 'Sound Texture', or 'Prominent Instrument'). In a possible embodiment the feature values 5A of the feature vectors 5 for the music tracks 4 may be determined by extracting the audio signal from each music track 4 and subjecting the whole audio signal, or at least one of its representative segments, to a computer-based automated musical analysis process that may comprise a machine learning engine pre-trained for the extraction of high-level audio features.

In the context of the present disclosure, 'metadata' refers to any kind of textual information associated with its linked music track 4. Usually this metadata is embedded in the respective audio file, but it can also be stored separately from the audio file. Examples of the types of information that can be stored in the metadata of a music track 4 in the form of metadata records include: Song title, Band or Artist, Album name, Genre of music, Album track number, Release date, etc. Accordingly, the metadata 6 provided on the remote server 2 linked to each music track 4 comprises at least one type of metadata record 6A representing associated information about the respective music track 4.

Further provided on the remote server 2 is a similarity matrix 7, wherein the values of this similarity matrix 7 each represent a measure of similarity between different metadata records 6A of the same type. As with the term 'vector' above, in the present context a 'matrix' is also meant to be interpreted in a broad sense, simply defining an entity comprising a plurality of values in a specific arrangement in at least 2 dimensions. In an exemplary embodiment, the similarity matrix 7 is a 2-dimensional matrix arranged such that each row and column is associated with a specific artist, and the values of the similarity matrix 7 each represent a measure of similarity between these different artists.

Figure 10:
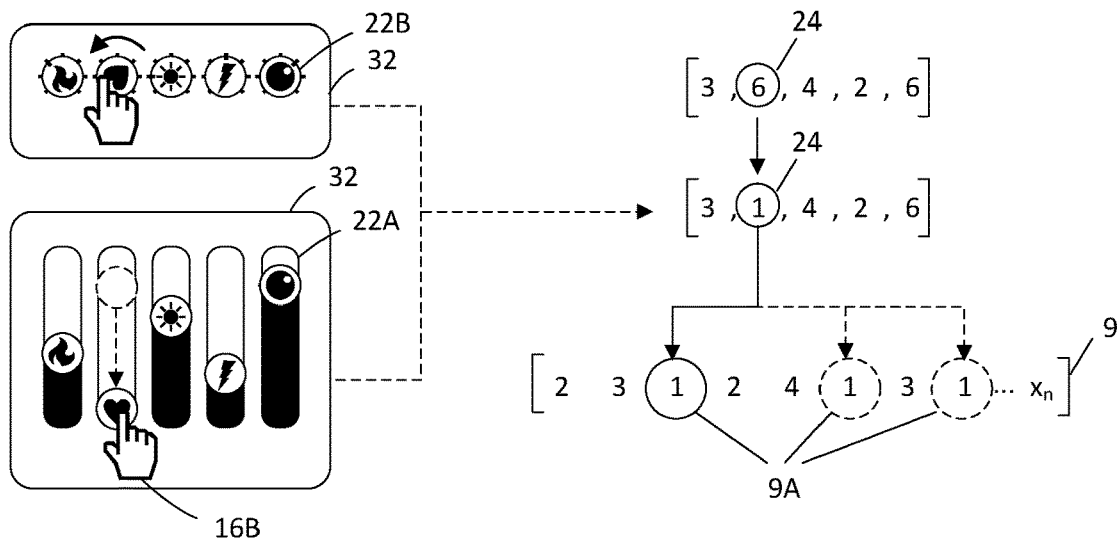
FIG. 10 illustrates the connection between gradual adjustment elements and the input vector in accordance with a possible implementation form of the first aspect.

As shown in FIG. 1, in a first step 101 a query 8 is sent from the client device 1 and received on the remote server 2. The query 8 comprises an input vector 9 and at least one input metadata record 6B. The input vector 9 is similar in its structure to the feature vectors 5 and comprises input values 9A (as illustrated in FIG. 10). In some embodiments some or all of these input values 9A correspond to one or more feature values 5A. The input metadata record 6B is similar to metadata records 6A stored in metadata 6 provided on the remote server 2. In some embodiments the input metadata record 6B directly corresponds to a specific metadata record 6A on the remote server 2.

In a next step 102, an ordered set of music tracks 10 is selected from the storage device 30B on the remote server 2 based on the input vector 9 and the input metadata record(s) 6B. This selection is done in several sub-steps, as illustrated in FIG. 2 and FIG. 3.

Figure 2:
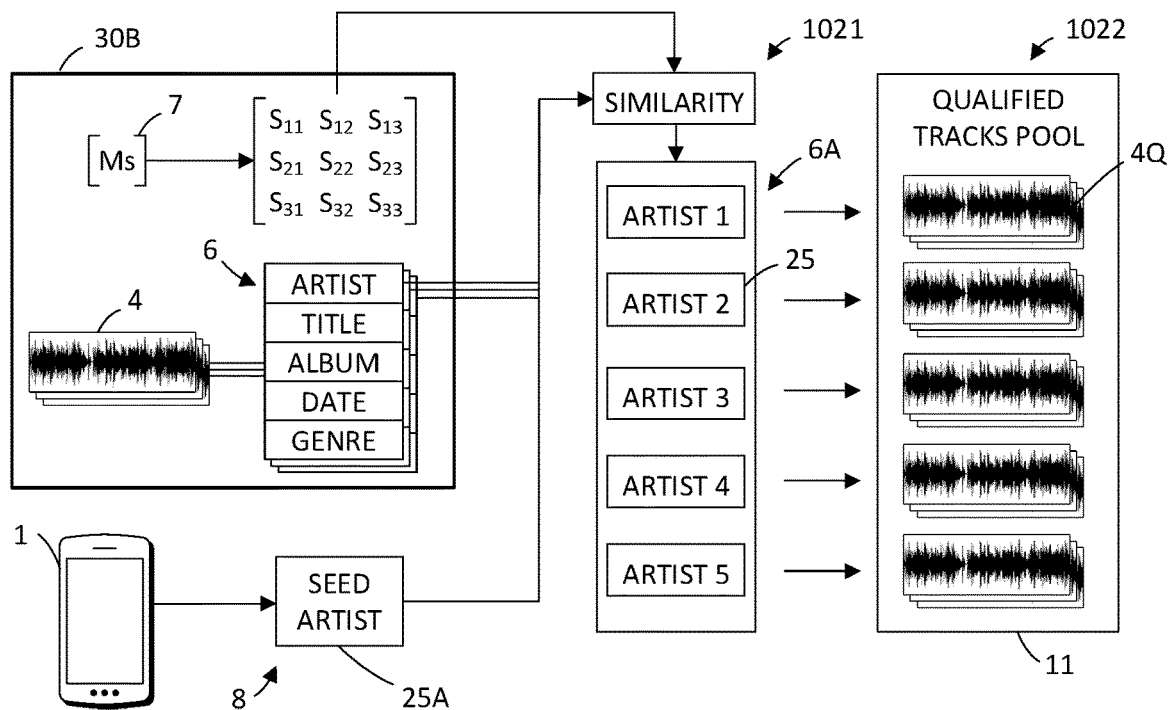
FIG. 2 shows a flow diagram of determining a qualified tracks pool in accordance with a possible implementation form of the first aspect.

In a first sub-step 1021 illustrated in FIG. 2, a number of similar metadata records 6A is determined with respect to the input metadata record 6B based on the values of the similarity matrix 7 that represent a measure of similarity between different metadata records 6A of the same type, as explained above. In an embodiment where the input metadata record 6B corresponds to a specific metadata record 6A of the metadata 6 provided on the server 2, selection of the number of similar metadata records 6A is done by cross-referencing the similarity matrix 7 and selecting the metadata records 6A that are closest in similarity to the input metadata record 6B. In an embodiment the number $n_m$ of similar metadata records is $1 \leq n_m \leq 1000$, more preferably $1 \leq n_m \leq 100$, most preferably $n_m = 50$.

In possible embodiments, a range of different calculation methods can be used alone or in combination for determining similarity between different metadata records 6A of the same type (such as similar artists) including (but not limited to) probabilistic methods such as a Gaussian mixture model, artificial neural networks (such as autoencoders) or Collaborative Filtering techniques.

In a next sub-step 1022, also illustrated in FIG. 2, a qualified tracks pool 11 is determined whereby, for each similar metadata record 6A determined in the previous step, a number of qualified music tracks 4Q is selected from the storage device 30B. The qualified music tracks 4Q are selected from the music tracks 4 which comprise the respective similar metadata record 6A in their metadata 6. In an embodiment the number $n_q$ of qualified music tracks for each similar metadata record is $1 \leq n_g \leq 1000$, more preferably $1 \leq n_q \leq 500$, most preferably $n_q = 100$.

If the predefined number $n_q$ for the selection of the qualified music tracks is fewer than the number of all the music tracks 4 which comprise the respective similar metadata record 6A in their metadata 6, the selection can be further improved by e.g. popularity, play count, or other factors.

In an embodiment, as also illustrated in FIG. 2, the metadata 6 comprises the artist 25 of the respective music track, and the similarity matrix 7 comprises information about similarity between artists 25. In this embodiment, the query 8 may comprise a reference to a seed artist 25A. Accordingly, determining the number of similar metadata records 6A may comprise determining a number $n_m$ of most similar artists 25 with respect to the seed artist 25A; and the qualified tracks pool 11 may comprise a number $n_q$ of qualified music tracks 4Q from each of the number $n_m$ of most similar artists 25.

In a next sub-step 1024, as illustrated in FIG. 3, an order of the music tracks 4 within the qualified tracks pool 11 is determined. The order is based at least in part on a distance between the respective feature vector 5 of each qualified music track 4Q and the input vector 9 in the vector space. In a possible embodiment, whereby a music track 4 may have several feature vectors 5 linked therewith in a database 3 stored on the storage device 30B (e.g. each feature vector 5 associated with a different part of the respective music track 4), the order of the music tracks 4 within the qualified tracks pool 11 may be based on a distance between their respective feature vectors 5 taken separately, or in an arbitrary or temporally ordered combination.

In a further possible embodiment only a part of each feature vector 5 is taken into account for the calculation of vector distances. In an embodiment each or all of the feature values 5A in a feature vector 5 are assigned a weight (e.g. based on their relevance for similarity calculations) and these weighted feature values 5A are taken into account for the calculation of vector distances.

In a possible embodiment the distance between the feature vectors 5 (or parts of feature vectors) is determined by calculating their respective pairwise (Euclidean) distances in the vector space, whereby the shorter pairwise (Euclidean) distance represents a higher degree of similarity between the respective feature vectors 5. In a further possible embodiment, the respective pairwise distances between the feature vectors 5 are calculated with the inclusion of an optional step whereby Dynamic Time Warping is applied between the feature vectors 5. Similarly as above, the shorter pairwise (Euclidean) distance represents a higher degree of similarity between the respective feature vectors 5.

Once the ordered set of music tracks 10 is determined, in a final step 103, as a reply to the query 8, a playlist 12 is returned to the client device 1.

The term 'playlist' in this context is meant to be interpreted simply as an ordered list of media content items, such as music tracks 4.

The playlist is based on the ordered set of music tracks 10, taking into account further possible factors such as the number $N_p$ of tracks to be presented in the playlist 12, which may be determined based on e.g. constraints of the display 36 or the GUI 32 of the client device 1, or predefined rules concerning the user experience. In an embodiment the number $N_p$ of music tracks in the playlist is $1 \leq N_p \leq 100$, more preferably $1 \leq N_p \leq 50$, most preferably $N_p = 25$.

Figure 4:
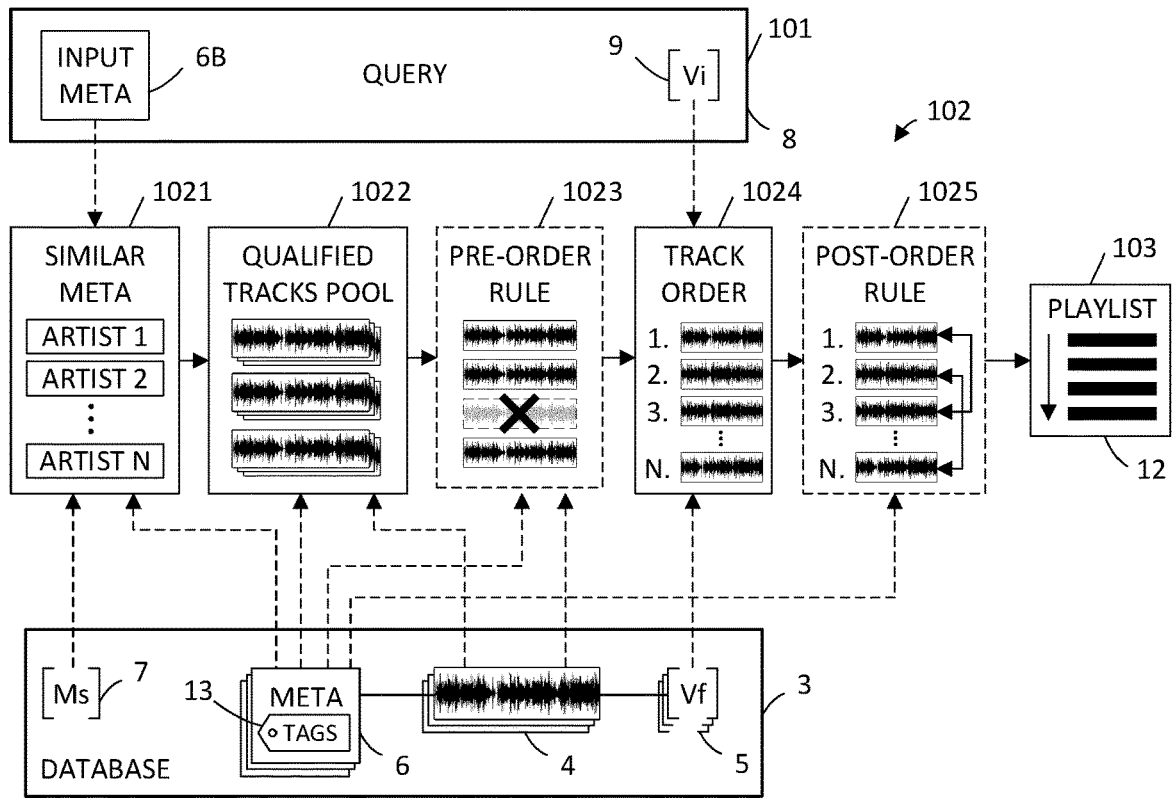
FIG. 4 shows a flow diagram of determining a playlist by further applying pre-order rules and post-order rules in accordance with a possible implementation form of the first aspect.

In a possible embodiment illustrated in FIG. 4, the metadata records 6A may further comprise tags 13 such as language, release year, ceremonial, seasonal, explicit, remix, live, karaoke, cover, non-music, or flagged; and determining the ordered set of music tracks 10 may comprise additional sub-steps with the purpose of, amongst others, fine adjustments and filtering out irrelevant results, as follows.

Before determining the order of the music tracks, in a sub-step 1023, one or more pre-order rule(s) 14 may be applied in order to remove music tracks whose metadata records 6A comprise a tag 13 that was blacklisted in the pre-order rule 14, or to remove music tracks whose metadata records 6A do not comprise a tag 13 that was whitelisted in the pre-order rule 14.

An exemplary list of such blacklisted tags may be: christmas (music with Christmas content), whitelist christmas (music without Christmas content, but suitable for Christmas), children (music intended for children), whitelist children (music not specifically targeted for children, but a part of children's repertoire, e.g. songs on Hits for Kids), comedy (music with comedic content or purpose), devotional hindi, devotional islam, remix, live, karaoke, cover band, non music (Speeches, applause, skits, etc.), instrumental (instrumental versions without vocals) and flagged (a tag that indicate uncertainties regarding an applied tag to an artist, album, or track).

For a track metadata comprising multiple tags, rules may be applied with an "AND" condition, but there may be predefined combinations where only one of the tags apply (such as christmas+whitelist children, where only the christmas tag should be applied). In further possible embodiments certain types of tags should be prioritized above other types, such as content-related tags prioritized above version-related tags.

Pre-order rule(s) 14 may also be applied in order to add music tracks from the storage device 30B to the qualified tracks pool 11 whose metadata do not necessarily comprise the respective similar metadata record 6A, but whose metadata records 6A comprise a tag 13 whitelisted in the pre-order rule 14. Furthermore, pre-order rule(s) 14 may also be based on metadata 6 and be applied in order to remove a recurring music track 4, to remove a recurring title, or to add a music track 4 comprising the input metadata record 6B. In further possible embodiments, where metadata records 6A comprise language tags, these tags should be taken into consideration for adding/removing tracks based on the location of the client device (or nationality of the user, if known), further optionally taking into account nationality of the artist.

Furthermore, after determining the order of the music tracks, in a sub-step 1025, one or more post-order rule(s) 15 may be applied in order to adjust the order of the music tracks 4 based on their metadata 6 for example by decreasing or increasing spacing between music tracks 4 from the same artist (or similar artists) or having the same (or similar) title, or decreasing or increasing the ranking of music tracks 4 from new or trending artists.

In possible embodiments the minimum spacing between tracks from the same artist is 8 tracks in case of a seed artist, and 15 tracks in case of an artist defined as a flavour element, and 25 tracks in case of similar artists. In a further possible embodiment, the minimum spacing between tracks from the same album is 25 tracks, between tracks with the same title is 100 tracks, and 200 tracks for tracks with the same title AND from the same artist.

Figure 5:
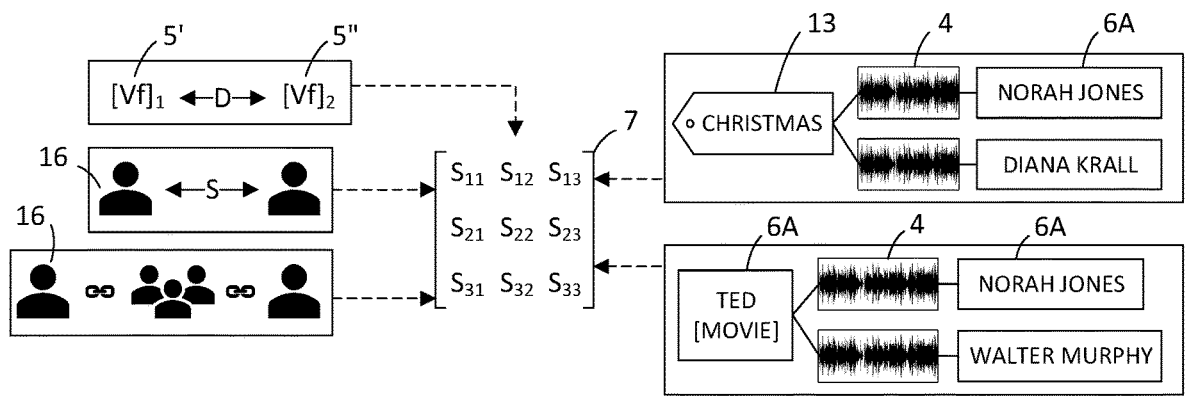
FIG. 5 illustrates possible ways of determining degrees of similarity between different metadata records for creating a similarity matrix in accordance with a possible implementation form of the first aspect.

In certain embodiments, as illustrated in FIG. 5, determining degrees of similarity between different metadata records 6A for creating the similarity matrix 7 may be based on one more of the following factors:

- distance between feature vectors 5 of all music tracks which have the respective metadata record 6A in their metadata 6;
- degree of similarity between user IDs 16A linked with the respective metadata records 6A, wherein user ID 16A similarity is determined based on the similarity between music tracks linked with the respective user IDs 16A, and wherein the links between user IDs 16A and music tracks are determined based on recorded user interactions 16B with music tracks on a client device 1 such as liking, skipping, repeating, rewinding, or adding a music track to a playlist;
- social relationships between user IDs 16A linked with the respective metadata records 6A based e.g. on Collaborative Filtering;
- the co-presence of the respective metadata records 6A and at least one of certain predefined tags 13 such as Christmas, devotional, certain languages, certain countries, etc. in the metadata 6 of any music tracks 4; or
- the co-presence of the respective metadata records 6A and at least one further, identical metadata record 6A such as same performer, same movie director, same theme, same lyrical concept, same hairdresser in the metadata 6 of any music tracks 4.

Figure 6:
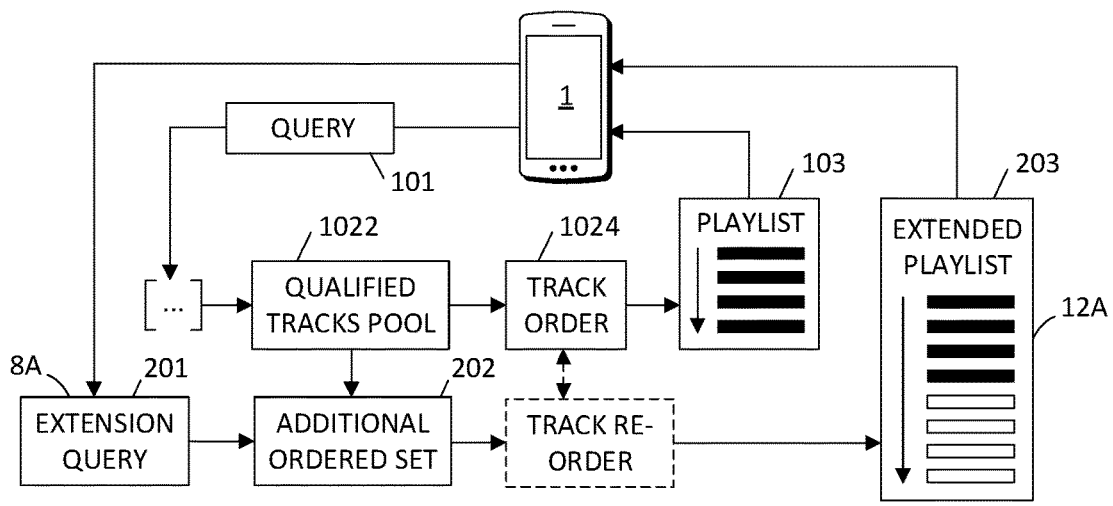
FIG. 6 shows a flow diagram of determining an extended playlist in accordance with a possible implementation form of the first aspect.

FIG. 6 shows a flow diagram of determining an extended playlist 12A in accordance with the present disclosure. In this implementation, steps and features that are the same or similar to corresponding steps and features previously described or shown herein are denoted by the same reference numeral as previously used for simplicity.

In a first step 201, a playlist extension query 8A is received on the remote server 2 from the client device 1, in a similar fashion to the original query 8. This playlist extension query 8A may only comprise a simple request for an additional set of music tracks 4 to be presented, but it may also comprise additional information, such as a (second) input vector 9 or input metadata record 6B, and/or further information regarding a previous query 8.

In a next step 202, an additional ordered set of music tracks 10A is selected from the qualified tracks pool 11 based at least in part the previously determined ordered set of music tracks 10. However, an important distinction is that the additional ordered set comprises music tracks 4 that were not fully included in a previous ordered set. Furthermore, the additional ordered set can also be re-ordered, if necessary, to ensure that no previous order is repeated.

In a next step 203, as a reply to the playlist extension query 8A, an extended playlist 12A is returned to the client device 1. The extended playlist 12A is based on the additional ordered set of music tracks 10A, and optionally also on a previously returned playlist 12, to avoid repetition.

Figure 7:
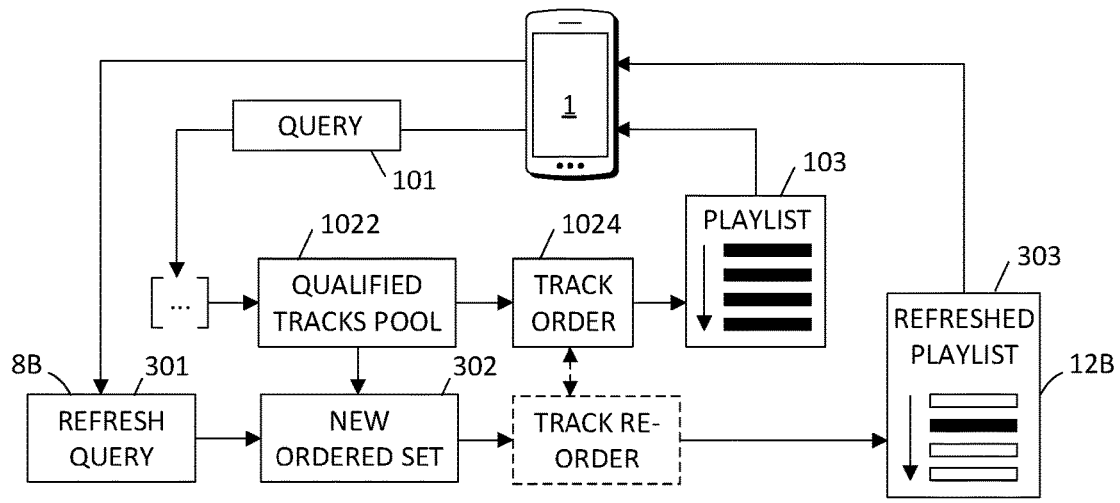
FIG. 7 shows a flow diagram of determining a refreshed playlist in accordance with a possible implementation form of the first aspect.

FIG. 7 shows a flow diagram of determining a refreshed playlist 12B in accordance with the present disclosure. In this implementation, steps and features that are the same or similar to corresponding steps and features previously described or shown herein are denoted by the same reference numeral as previously used for simplicity.

In a first step 301, a playlist refresh query 8B is received on the remote server 2 from the client device 1, in a similar fashion to a playlist extension query 8A, or to the originally received query 8. This playlist refresh query 8B may only comprise a simple request for a refreshed set of music tracks 4 to be presented, but it may also comprise additional information, such as a (second) input vector 9 or input metadata record 6B, and/or further information regarding a previous query 8.

In a next step 302, a new ordered set of music tracks 10B is selected from the qualified tracks pool 11 based at least in part the previously determined ordered set of music tracks 10. However, an important distinction is that the new ordered set differs at least in part from any previous ordered set 10 or 10A.

In a next step 303, as a reply to the playlist refresh query 8B, a refreshed playlist 12B is returned to the client device 1. The refreshed playlist 12B is based on the new ordered set of music tracks 10B.

Figure 8:
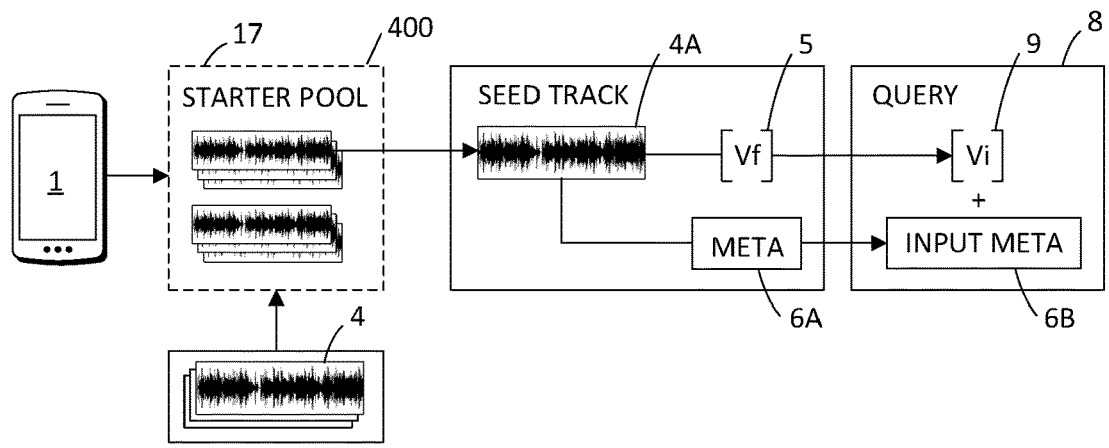
FIG. 8 illustrates determining an input vector and an input metadata record from a seed music track in accordance with a possible implementation form of the first aspect.

FIG. 8 illustrates determining an input vector 9 and an input metadata record 6B from a seed music track 4A in accordance with the present disclosure. In this implementation, steps and features that are the same or similar to corresponding steps and features previously described or shown herein are denoted by the same reference numeral as previously used for simplicity.

As shown in the figure, the query 8 received from the client device in this implementation comprises a reference to a seed music track 4A from within the plurality of music tracks 4. The input vector 9 can be determined based on the linked feature vector 5 of the seed music track 4A, for example by one-to-one correspondence between the feature values 5A of the feature vector 5 of the seed music track 4A and the input values 9A of the input vector 9.

In an embodiment, the feature values 5A and input values 9A may range from 1 to 100, more preferably from 1 to 10. In a preferred embodiment, the feature values 5A and input values 9A have a value range between 1 and 7.

In a similar fashion, the input metadata record 6B is determined based on the respective metadata record 6A of the metadata 6 of the seed music track.

In an embodiment, as also shown in FIG. 8, the seed music track 4A is determined by creating, in a first step 400, a starter pool 17 within the plurality of music tracks 4 and selecting the seed music track 4A from this starter pool 17. The starter pool 17 may comprise music tracks 4 based on one or more of the following:
- a predetermined user taste profile 16C e.g. based on previous user interactions 16B with music tracks 4 on the client device 1, such as liking, skipping, repeating, rewinding, or adding to a playlist,
- a list of currently trending music tracks 4 or artists,
- current date or time of the client device 1, or
- current location of the client device 1.

Figure 9:
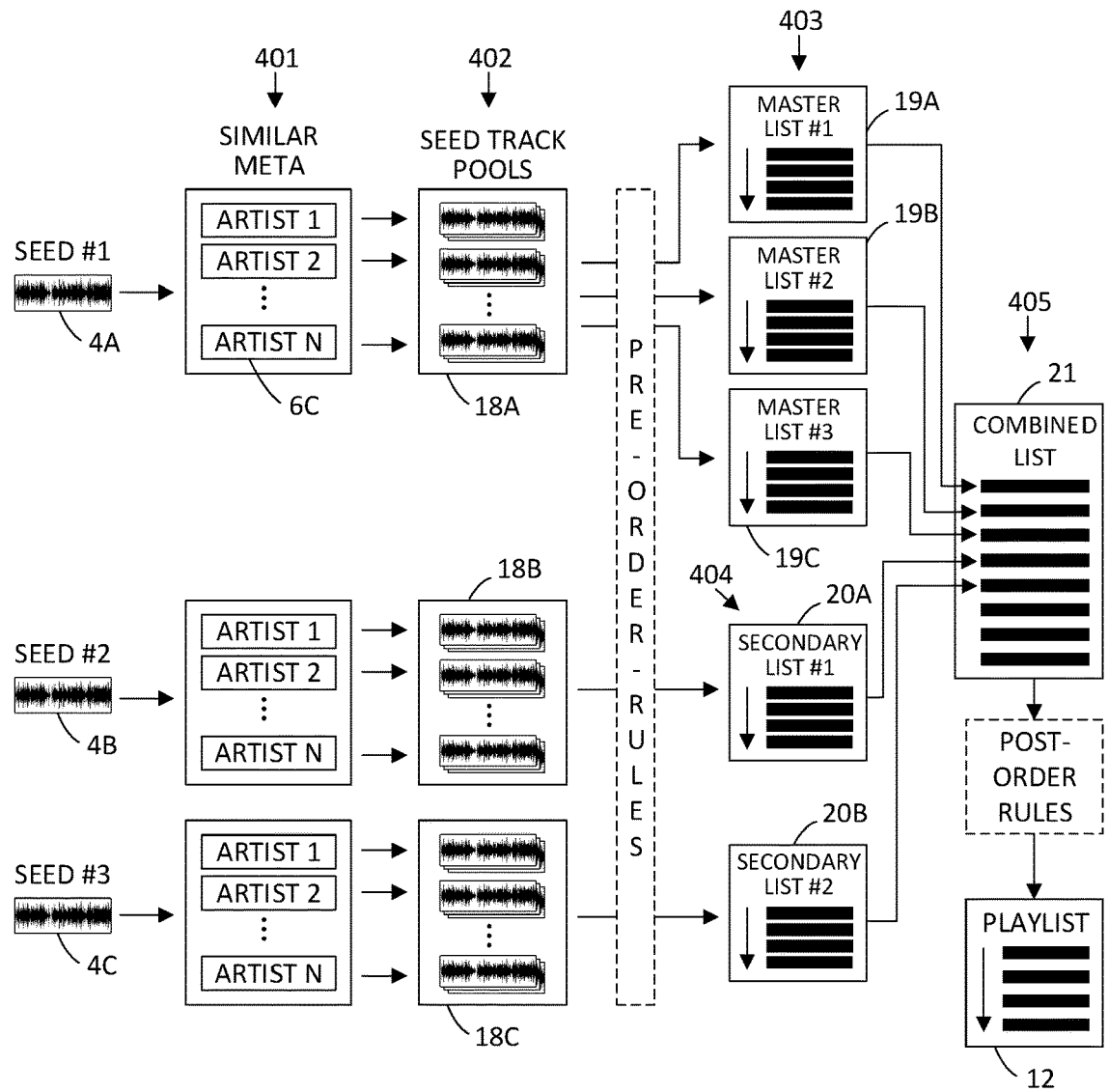
FIG. 9 shows a flow diagram of determining a playlist based on a plurality of seed music tracks in accordance with a possible implementation form of the first aspect.

FIG. 9 shows a flow diagram of determining a playlist 12 based on a plurality of seed music tracks 4A in accordance with the present disclosure. In this implementation, steps and features that are the same or similar to corresponding steps and features previously described or shown herein are denoted by the same reference numeral as previously used for simplicity. In this embodiment the received query 8 comprises references to a plurality $n_s$ of seed music tracks 4A, 4B, 4C, preferably arranged in an order of priority (e.g. according to an order chosen on the GUI 32 by a user 16).

In a first step 401, for each seed music track 4A, a number $n_m$ of similar seed metadata records 6C are determined with respect to their respective input metadata record 6B using the similarity matrix 7 in a similar fashion to determining the similar metadata records 6A, as described above in connection with FIG. 2. In an embodiment the number $n_m$ of similar seed metadata records is $1 \leq n_m \leq 1000$, more preferably $1 \leq n_m \leq 100$, most preferably $n_m = 50$.

In a next step 402, a seed track pool 18A, 18B, 18C is created for each seed music track 4A comprising, for each similar seed metadata record 6C, a number $n_q$ of music tracks 4 from the storage device 30B which comprise the similar seed metadata record 6C in their metadata 6. This step is executed in a similar fashion to creating the qualified tracks pool 11, as described above in connection with FIG. 2. In an embodiment the number $n_q$ of music tracks for each similar seed metadata record is $1 \leq n_g \leq 1000$, more preferably $1 \leq n_g \leq 500$, most preferably $n_q = 100$.

In an optional next step, as indicated also in the figure, pre-order rules can be applied to any or each of the seed track pools 18A, 18B, 18C in a similar fashion and with similar purposes (to add or remove certain music tracks) as described above in connection with FIG. 4.

In a next step 403, a number $n_s$ of master lists 19A, 19B, 19C are created by sorting the music tracks 4 from the highest priority master seed track pool 18A, based on their feature vector 5 distances from each seed music track 4A, 4B, 4C respectively, in descending priority order.

In a next step 404, a number $n_s-1$ of secondary lists 20A, 20B are created by sorting the music tracks 4 from each of the remaining secondary seed track pool 18B, 18C in descending priority order, based on their feature vector 5 distances from the first seed music track 4A.

The vector distances in these two steps above are calculated similarly as with respect to the step 1024 of determining an order of the music tracks 4 within the qualified tracks pool 11, as described above in connection with FIG. 3.

In a next step 405, a combined list 21 is created by concatenating the first music tracks 4 of each master list 19A, 19B, 19C in descending order, followed by the first music tracks 4 of each secondary list 20A, 20B in descending order, followed by the consecutive music tracks 4 from each list in a similar fashion.

In an optional next step, as indicated also in the figure, post-order rules can be applied to the combined list 21 in a similar fashion and with similar purposes (to adjust the order of the music tracks based on their metadata) as described above in connection with FIG. 4.

In a final step, the playlist 12 is returned to the client device 1 as a reply to the query 8. The playlist in this case is based on the combined list 21, taking into account further possible factors such as the number of tracks to be presented in the playlist 12, as already described before.

Although in FIG. 9 the illustrated number of seed music tracks 4A is three, it has to be understood that this is only an exemplary embodiment, and the same method applies to any number of seed tracks 4A, mutatis mutandis. For example, in an embodiment the number $n_s$ of seed music tracks is $1 < n_s \leq 10$, more preferably $1 < n_s \leq 5$.

FIG. 10 illustrates the connection between gradual adjustment elements 22 and the input vector 9 in accordance with the present disclosure. In the illustrated embodiment, the input values 9A of the input vector 9 are determined by providing, on a GUI 32 of the client device 1, at least one gradual adjustment element 22 movable between two end positions. These gradual adjustment elements 22 each graphically represent a variable 24 associated with at least one input value 9A of the input vector 9. In an embodiment, the position of a gradual adjustment element 22 relative to its end positions represents the value of the variable 24.

In this embodiment, detecting a user interaction 16B with at least one of the gradual adjustment elements 22 results in moving the gradual adjustment element 22 to a new position, and determining the input values 9A of the input vector 9 is based on the new value of the variables 24 affected by the user interaction 16B.

In an embodiment, the gradual adjustment elements 22 comprise at least one slider 22A movable by dragging between two end points along a vertical or horizontal axis. In another embodiment the gradual adjustment elements 22 (further) comprise at least one rotatable knob 22B movable by rotating clockwise or counter-clockwise between two extreme positions.

In an embodiment the number of gradual adjustment elements is between 1 and 10, more preferably between 1 and 5, and most preferably the number of gradual adjustment elements is 5.

In a preferred embodiment illustrated in FIG. 10, the GUI 32 comprises five gradual adjustment elements 22 (sliders 22A or knobs 22B), each representing a different musical/emotional quality: 'Sensual', 'Tender', 'Happy', 'Angry', and 'Tempo'. These qualities are expressed with the use of representative icons, as illustrated in the figure. Moving the slider 22A or knob 22B associated with the quality 'Tender' for example will affect, through the change in the respective variable 24, the input values 9A of the input vector 9 associated with tenderness, which in turn will result in a more or less tender playlist 12 comprising music tracks 4 with associated feature vectors 5 whereby the respective feature values 6A are closer to these changed input values 9A.

Figure 11:
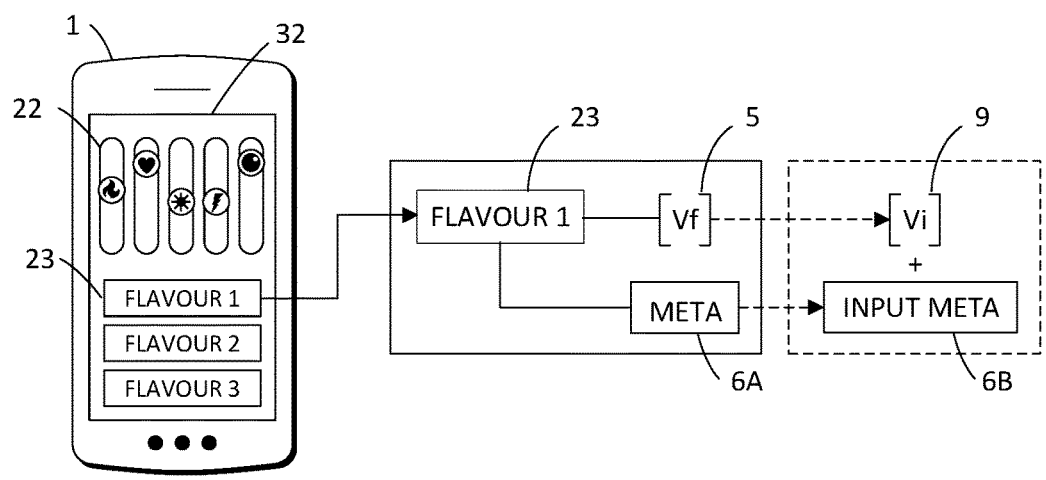
FIG. 11 illustrates the connection between flavour elements and the input vector and input metadata record in accordance with a possible implementation form of the first aspect.

FIG. 11 illustrates the connection between flavour elements 23 and the input vector 9 and input metadata record 6B in accordance with the present disclosure. In the illustrated embodiment, the input values 9A of the input vector 9 and the input metadata record 6B are determined by providing, on a GUI 32 of the client device 1, at least one flavour element 23. Since each flavour element 23 has at least one (directly or indirectly) associated input vector 9 and a reference to at least one metadata record 6A in the similarity matrix 7, the input values 9A of the input vector 9 and the input metadata record 6B can be determined in a similar fashion as described above in connection with FIG. 8.

Figures 12A, 12B, 12C, 12D:
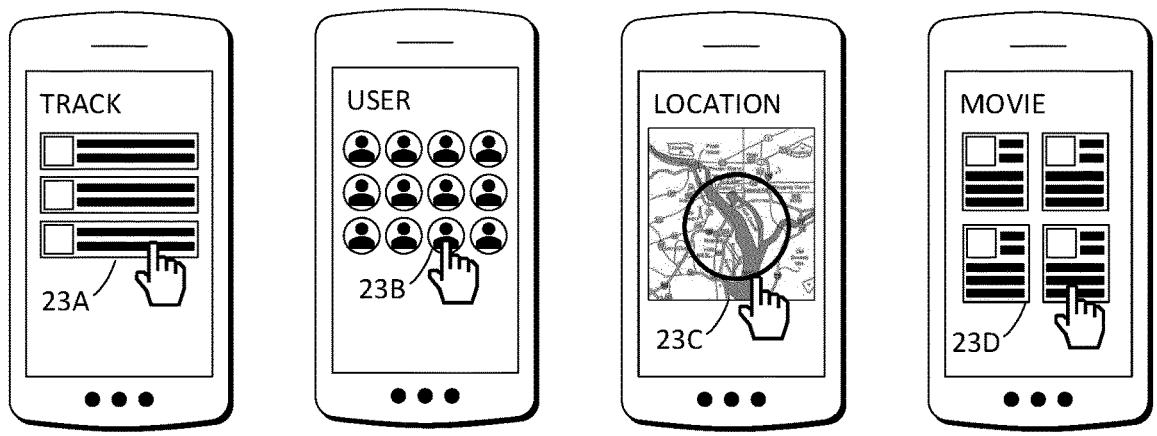
FIGS. 12A-12D show graphical user interfaces illustrating different flavour elements in accordance with a further possible implementation form of the first aspect.

In one possible embodiment shown on FIG. 12A the flavour element 23 is a textual reference to a piece of metadata comprising artist name and track title, which may be directly associated with at least one metadata record 6A of a music track 4 or can be used to generate an input vector 9. The user 16 can select an artist name or track title on the GUI 32, which then results in determining a playlist 12 according to the selected artist name or track title.

In one further possible embodiment shown on FIG. 12B the flavour element 23 is a graphical or textual reference to a user ID, such as a profile picture or username, wherein the user ID may be associated with at least one metadata record 6A of the plurality of music tracks 4 or can be used to generate an input vector 9. The association can be based on the user history recorded under the respective user ID, such as listening history of music tracks 4 on a client device 1, on a media streaming service, or obtained from a 3rd party service. The user 16 can select a profile picture or username on the GUI 32, which then results in determining a playlist 12 according to the selected user ID.

In one further possible embodiment shown on FIG. 12C the flavour element 23 is a graphical reference to a location, such as a region of an interactive map, wherein the location may be associated with at least one metadata record 6A of the plurality of music tracks 4 or can be used to generate an input vector 9. The user can specify a location on the GUI 32 (either by searching for a specific place, such as the city of Copenhagen, or using an interactive map element) and, optionally, setting a radius defining a region on the map around the set location. This then results in determining a playlist 12 according to the selected location or region based on, for example, textual references in the lyrics of a music track, or a specific language of a music or audio track—however the association can be much less direct, based solely on e.g. a certain mood associated with the selected location (e.g. "rainy" for London).

In one further possible embodiment shown on FIG. 12D the flavour element 23 is a textual reference 23D indirectly associated with at least one of the plurality of music tracks 4 such as a brand name, an ideology, or a title of a book, a movie, or a TV show. In a similar fashion as above, selecting any of these flavour elements 32 results in determining a playlist 12 accordingly.

In some embodiments, where the seed music track 4A is selected from a starter pool 17, this starter pool 17 may be determined using a flavour element 23. In particular, the starter pool 17 may be determined based on the distances between the feature vector 5 of each music track 4 of the starter pool 17 with respect to the input vector 9 associated with a flavour element 23 as described above. This way a flavour element 23 and one or more seed tracks 4A may be combined in a query 8 to determine a playlist 12.

In further embodiments, multiple flavour elements 23 may be selected on the GUI 32 by the user 16 (in combination with one or more seed tracks 4A). In such cases the starter pool 17 may be determined based on the vector distances of the feature vector 5 of each music track 4 in the starter pool 17 with respect to either one input vector 9 determined based on multiple flavour elements 23, or with respect to multiple input vectors 9, each determined based on a respective flavour element 23, as described above.

This way multiple flavour elements 23 and one or more seed tracks 4A may be combined in a query 8 to determine a playlist 12.

Figure 13:
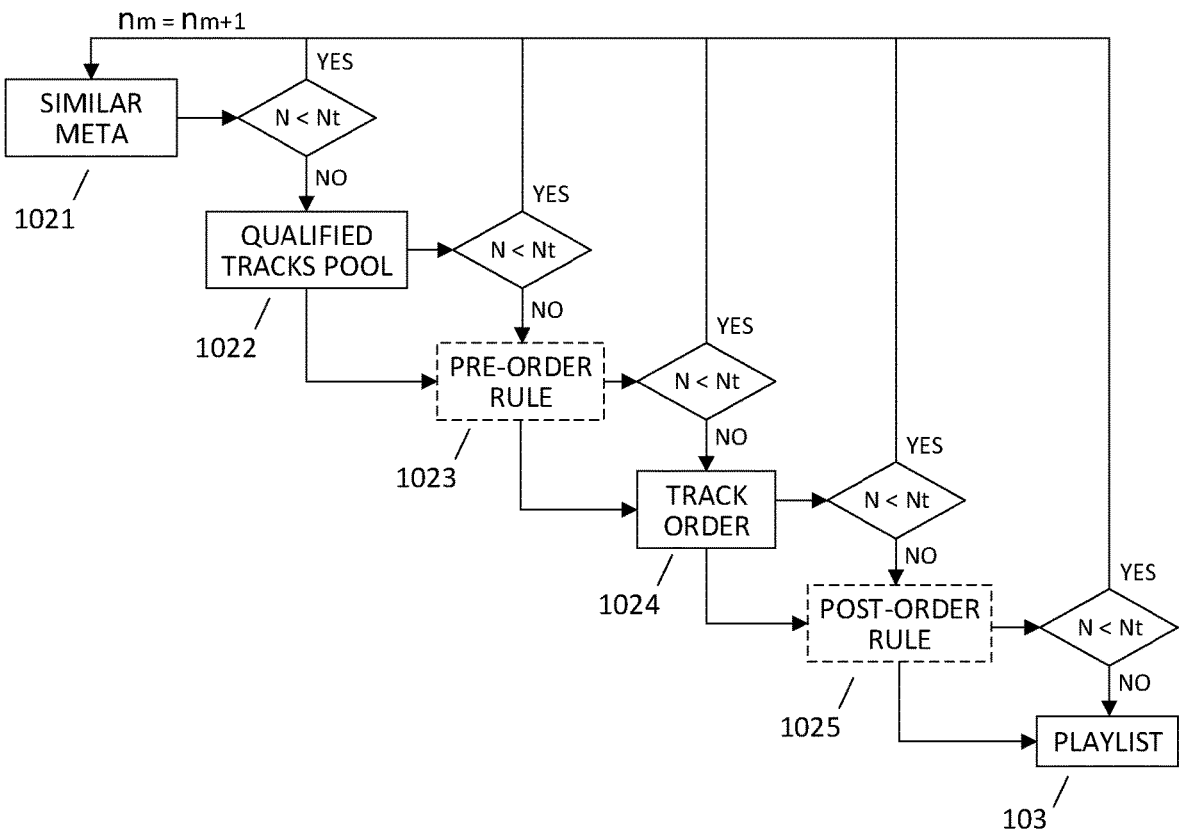
FIG. 13 shows a flow diagram of determining a playlist in an iterative process involving possible feedback loops in accordance with a possible implementation form of the first aspect.

FIG. 13 shows a flow diagram of determining a playlist 12 in an iterative process involving possible feedback loops in accordance with the present disclosure. In particular, in this implementation, any method step that results in a different set of music tracks 4 than its preceding method step (such as 1022 determining a qualified tracks pool 11, 1023 applying a pre-order rule 14, 1024 determining an order, 1025 applying a post-order rule 15) further involves a feedback loop to the step 1021 of determining the number $n_m$ of similar metadata records 6A. The condition for feeding back to the step 1021 is that in case the number N of music tracks 4 in the resulting different set in any of the steps doesn't meet a threshold $N_t$, a different (enlarged) number $n_{s+1}$ of similar metadata records 6A is determined, and the subsequent method steps are repeated in an iterative manner until the threshold is met. In an embodiment the threshold $N_t$ of music tracks to compare to the number N of music tracks in a resulting set is $N_t=5,000$.

In a possible embodiment any particular combination of set values of gradual adjustment elements 22, flavour elements 23 and/or seed tracks 4A can be saved as an 'agent' on the client device 1 itself or on the remote server 2. This 'agent' can then be used as a separate entity to be copied and shared between users 16 for dynamically generating playlists from different databases 3 of music tracks 4, as well as from the same database 3 after an (automatic) update of music tracks 4.

In a further possible embodiment, the resulting playlists 12 can (also) be saved on a local storage 30A on the client device 1 itself or on the remote server 2 to be re-used (e.g. to serve as a starting pool for further playlist calculations) or shared between users 16.

FIG. 14 shows a schematic view of an illustrative computer-based system in accordance with the present disclosure, wherein the system comprises a client device 1 and a remote server device 2 in data communication with each other via e.g. a computer network.

In some embodiments, the system includes multiple servers 2, multiple client devices 1, or both multiple servers 2 and multiple client devices 1. To prevent overcomplicating the drawing, only one server 2 and one client device 1 are illustrated.

The client device 1 may in an embodiment be a portable media player, a cellular telephone, pocket-sized personal computer, a personal digital assistant (PDA), a smartphone, a desktop computer, a laptop computer, and any other device capable of communicating via wires or wirelessly (with or without the aid of a wireless enabling accessory device).

The server 2 may include any suitable types of servers that are configured to store and provide data to a client device (e.g., file server, database server, web server, or media server). The server 2 can store media and other data (e.g., digital audio signals of musical compositions, or metadata associated with musical compositions), and the server 2 can receive data download requests from the client device 1.

The server 2 can communicate with the client device 1 over a communications link which can include any suitable wired or wireless communications link, or combinations thereof, by which data may be exchanged between server 2 and client 1. For example, the communications link can include a satellite link, a fiber-optic link, a cable link, an Internet link, or any other suitable wired or wireless link.

The communications link is in an embodiment configured to enable data transmission using any suitable communications protocol supported by the medium of the communications link. Such communications protocols may include, for example, Wi-Fi (e.g., a 802.11 protocol), Ethernet, Bluetooth (registered trademark), radio frequency systems (e.g., 900 MHz, 2.4 GHz, and 5.6 GHz communication systems), infrared, TCP/IP (e.g., and the protocols used in each of the TCP/IP layers), HTTP, BitTorrent, FTP, RTP, RTSP, SSH, any other communications protocol, or any combination thereof.

In an embodiment, the server 2 comprises a machine-readable storage device 30B including a program product 26 and configured to store a database 3 comprising a plurality of music tracks 4 and a feature vector 5 and metadata 6 linked to each music track 4. The server 2 may further comprise one or more processor(s) 31B operable to execute the program product 26, and to interact with the client device 1.

The client device 1 may comprise one or more processor(s) 31A and a GUI 32 controlled by the processor(s) 31A and configured to receive a query 8 from a user 16. The GUI 32 may be further configured to show to the user 16, as a reply to the query 8, a playlist 12 of music tracks 4 determined by executing the program product 26.

Notwithstanding the above, the client device 1 can also include a storage device 30A, a memory 33, a communications interface 34, an input interface 35, an audio interface 37, a display 36, and an internal bus 38. The client device 1 can include other components not shown in FIG. 14, such as a power supply for providing power to the components of the computer-based system. Also, while only one of each component is illustrated, the system can include more than one of some or all of the components.

Each storage device 30A,30B can store information and instructions to be executed by a processor 31A,31B. A storage device 30 can be any suitable type of storage offering permanent or semi-permanent memory. For example, the storage device 30 can include one or more storage mediums, including for example, a hard drive, Flash, or other EPROM or EEPROM. A processor 31A or 31B can control the operation and various functions of the client device 1, the server 2 and/or the whole system. As described in detail above, the processor 31B (and/or the processor 31A) can be configured to control the components of the system to execute a method of organizing music tracks into a playlist, in accordance with the present disclosure. The processors 31A,31B can include any components, circuitry, or logic operative to drive the functionality of the system 15. For example, the processors 31A,31B can include one or more processors acting under the control of an application or program product 26.

In some embodiments, the application or program product 26 can be stored in a memory 33. The memory 33 can include cache memory, flash memory, read only memory, random access memory, or any other suitable type of memory. In some embodiments, the memory 33 can be dedicated specifically to storing firmware for a processor 31A,31B. For example, the memory 33 can store firmware for device applications.

An internal bus 38 may provide a data transfer path for transferring data to, from, or between a storage device 30, a processor 31, a memory 33, a communications interface 34, and some or all of the other components of the client device 1 and/or the server 2.

A communications interface 34 enables the client device 1 to communicate with other devices, such as the server 2, either directly or via a computer network. For example, communications interface 34 can include Wi-Fi enabling circuitry that permits wireless communication according to one of the 802.11 standards or a private network. Other wired or wireless protocol standards, such as Bluetooth, can be used in addition or instead.

An input interface 35, audio interface 37, and display 36 provides a user interface for a user 16 to interact with the client device 1.

The input interface 35 may enable a user to provide input and feedback to the client device 1. The input interface 35 can take any of a variety of forms, such as one or more of a button, keypad, keyboard, mouse, dial, click wheel, touch screen, or accelerometer.

An audio interface 37 provides an interface by which the client device 1 can provide music and other audio elements to a user 16. The audio interface 37 can include any type of speaker, such as computer speakers or headphones.

A display 36 can present visual media and can be configured to show a GUI 32 to the user 16. A display 36 can include, for example, a liquid crystal display, a touchscreen display, or any other type of display.

Figure 15:
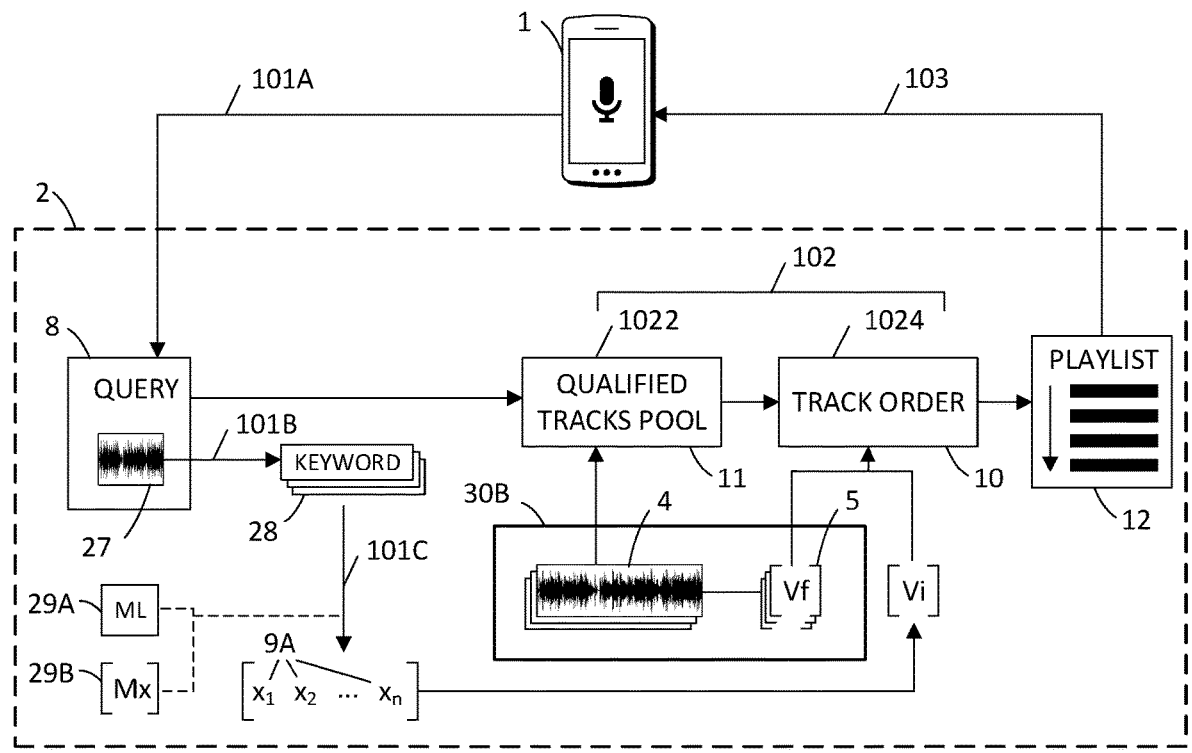
FIG. 15 shows a flow diagram of a method for organizing music tracks into a playlist in accordance with the second aspect, using a system in accordance with the second aspect.

FIG. 15 shows a flow diagram of an alternative method for organizing music tracks into a playlist in accordance with the present disclosure, using a computer-based system such as for example the system shown on FIG. 14. In this implementation, steps and features that are the same or similar to corresponding steps and features previously described or shown herein are denoted by the same reference numeral as previously used for simplicity.

According to this implementation, a client device 1 and a remote server 2 is provided in data connection with each other, wherein the client device comprises an audio interface 37 which is configured (e.g. by inclusion of one or more microphones) to receive natural language-based input, such as speech input. In some embodiments, the client device 1 is a smart speaker device or a similar connected Internet-of-Things (IoT) device connected to a wireless home network. In some embodiments, the client device 1 is a desktop computer. In some embodiments, the client device 1 is portable (such as e.g. a notebook computer, tablet computer, or handheld device). In some embodiments, the client device 1 is user-wearable. The remote server 2 may include any suitable types of servers that are configured to store and provide data to a client device 1 remotely (e.g., file server, database server, web server, or media server).

Accordingly, a storage device 30B comprising a plurality of music tracks 4 is also provided on the remote server 2, each music track 4 having linked therewith a feature vector 5 and metadata 6. In an embodiment, the plurality of music tracks 4 and their associated feature vector 5 and metadata 6 may be organized in a database 3 stored on the storage device 30B. In a further possible embodiment, the music tracks 4 and their associated feature vector 5 and metadata 6 may be stored on a storage device 30A of the client device 1 and may be organized in a database 3 stored on the storage device 30A.

As shown in FIG. 15, in a first step 101A a query 8 is sent from the client device 1 and received on the remote server 2. The query 8 comprises natural language-based input 27, which may comprise speech input originating from a user 16 of the client device 1. The speech input may comprise a predefined command configured to "wake up" the client device 1 and initiate a state of recording a subsequent query 8.

In possible embodiments, the natural language-based input 27 may comprise direct reference commands referring to e.g. a specific mood (e.g. "play something happy") or feature value corresponding to a mood (e.g. "play something more happy" or "increase happiness by 2 levels").

In possible embodiments the natural language-based input 27 may comprise direct reference to settings or states of gradual adjustment elements 22 as defined before.

In possible embodiments the natural language-based input 27 may comprise direct reference to one or more flavour elements 23 as defined before.

In possible embodiments, the natural language-based input 27 may comprise indirect reference commands referring to predefined mixed emotions (e.g. "play something bittersweet") intended to cover multiple moods or referring to mixed emotion values (e.g. "decrease spirituality by 2 levels") intended to cover multiple feature values corresponding to different moods. These mixed emotions may be defined in a mixed emotion database defining logical relationships between mixed emotions and moods and/or between mixed emotions and certain feature values corresponding to different moods.

In certain embodiments these mixed emotions may be defined uniquely for a specific user 16 based on listening history, social connections, e.g. using a user-specific mixed emotion database comprising weighted relevance values for each mixed emotion.

In possible embodiments, the natural language-based input 27 may comprise a synonym (e.g. another word or phrase known as a replacement) of a predefined mood or mixed emotion.

In possible embodiments, the natural language-based input 27 may comprise metaphorical, synthetic or abstract expressions indirectly related to a predefined mood or mixed emotion (e.g. a figurative or calculated term or a term borrowed for another subject matter).

In possible embodiments the natural language-based input 27 may be touch input initiated via a touchscreen or text input via a keyboard. In possible embodiments the natural language-based input 27 may be received in a conversational format, in the form of answers to questions posed via a user interface.

In a next step 101B the natural language-based input 27 is analyzed using a natural language processing algorithm to extract at least one keyword 28. This analysis may happen either on the client device 1 or on the server device 2. For extracting the keyword(s) 28 any suitable natural language processing algorithm may be used that is trained and suitable for processing and analyzing natural language-based input for extracting phrases and expressions as an output.

In a next step 101C an input vector 9 is calculated by mapping the at least one keyword 28 to a set of input values 9A.

In an embodiment, mapping the keyword(s) 28 to a set of input values 9A comprises applying a machine learning-based semantic algorithm 29A trained to predict a relevance of a set of semantic characteristics for a given keyword 28 in the form of input values 9A.

In another embodiment, mapping the keyword(s) 28 to a set of input values 9A comprises applying a semantic matrix 29B defining logical relationships between a set of keywords 28 and a corresponding set of semantic characteristics. In this embodiment, the respective values of the semantic matrix 29B are selected as input values 9A for a given keyword 28.

Once an input vector 9 is calculated, the next step is selecting 102 an ordered set of music tracks 10 from the storage device 30B. This is done by first determining 1022 a qualified tracks pool 11 comprising a number $n_q$ of qualified music tracks 4Q from said storage device 30B based on matching with said query 8.

In a subsequent step, an order of music tracks 4 within the qualified tracks pool 11 needs to be determined 1024 based at least in part on a distance between the whole or part of the feature vector 5 of each qualified music track 4Q with respect to the input vector 9 in the vector space.

Finally, a playlist 12 based on this ordered set of music tracks 10 is returned 103 to the client device 1, as a reply to said query 8, as already described before with respect to previous embodiments. In some embodiments, returning of the playlist 12 initiates audio playback on the client device 1 of one of the music tracks 4 from the playlist 12.

Figure 16:
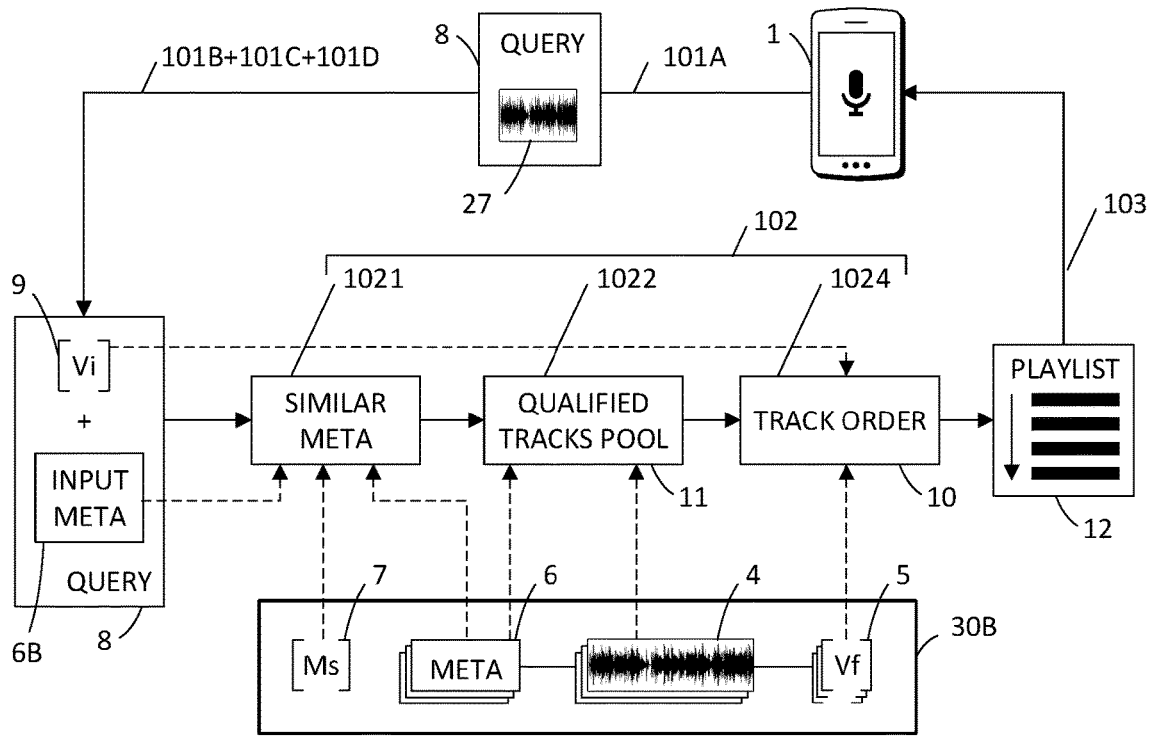
FIG. 16 shows a flow diagram of a method for organizing music tracks into a playlist in accordance with another possible implementation form of the second aspect.

In another possible embodiment illustrated in FIG. 16, the storage device 30B further comprises metadata 6 linked with each music track 4, the metadata 6 comprising at least one type of metadata record 6A representing associated information about the respective music track 4, as described before with respect to previous embodiments.

In this embodiment, the natural language-based input 27 is further analyzed 101D using a natural language processing algorithm to extract at least one reference to an input metadata record 6B.

Once an input vector 9 as well as an input metadata record 6B is calculated from the natural language-based input 27, the music tracks 4 are organized into a playlist in a similar manner as described before with respect to previous embodiments, using a similarity matrix 7 representing a measure of similarity between different metadata records 6A of the same type.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope.

The invention claimed is:

1. A computer-implemented method for organizing music tracks, the method comprising:
providing a client device, and a storage device in data connection with the client device;
providing, on the storage device, a plurality of music tracks, each music track having linked therewith a feature vector and metadata, wherein the feature vector comprises feature values representing semantic characteristics of the respective music track, and the metadata comprises at least one type of metadata record representing associated information about the respective music track;
providing a similarity matrix, the values of the similarity matrix representing a measure of similarity between different metadata records of the same type;
receiving a query from the client device comprising an input vector, and at least one input metadata record;
selecting an ordered set of music tracks from the storage device by determining a number $n_m$ of similar metadata records with respect to the input metadata record using the similarity matrix;
determining a qualified tracks pool comprising, for each similar metadata record, a number $n_q$ of qualified music tracks from the storage device which comprise the respective similar metadata record in their metadata;
determining an order of music tracks within the qualified tracks pool based at least in part on a distance between the whole or part of the feature vector of each qualified music track with respect to the input vector in the vector space; and
returning to the client device, as a reply to the query, a playlist based on the ordered set of music tracks.

2. The method according to claim 1, wherein the metadata records comprise tags; and wherein selecting the ordered set of music tracks further comprises:
applying, if applicable, at least one pre-order rule, before determining the order of the music tracks, in order to
remove music tracks whose metadata records comprise a tag blacklisted in the pre-order rule, or
remove music tracks whose metadata records do not comprise a tag whitelisted in the pre-order rule, or
add music tracks from the storage device whose metadata records comprise a tag whitelisted in the pre-order rule, or
adjust the qualified tracks pool according to a pre-order rule based on metadata other than a tag; and
applying, if applicable, at least one post-order rule to adjust the order of the music tracks based on their metadata.

3. The method according to claim 1, wherein determining the degree of similarity between different metadata records for creating the similarity matrix is based on at least one of:
distance between feature vectors of all music tracks which have the respective metadata record in their metadata;
degree of similarity between user IDs linked with the respective metadata records, wherein user ID similarity is determined based on the similarity between music tracks linked with the respective user IDs, and wherein the links between user IDs and music tracks are determined based on recorded user interactions with music tracks on a client device;
social relationships between user IDs (16A) linked with the respective metadata records;
the co-presence of the respective metadata records and at least one of certain predefined tags in the metadata of any music tracks; or
the co-presence of the respective metadata records and at least one further, identical metadata record in the metadata of any music tracks.

4. The method according to claim 1, further comprising
receiving, on the remote server, a playlist extension query from the client device;
selecting, on the remote server, an additional ordered set of music tracks from the qualified tracks pool based at least in part on the order, wherein the additional ordered set comprises music tracks that were not fully included in a previous ordered set;
re-ordering the additional ordered set, if necessary, to ensure that no previous order is repeated; and returning to the client device, as a reply to the playlist extension query, an extended playlist based on a previously returned playlist and the additional ordered set of music tracks.

5. The method according to claim 1, further comprising receiving, on the remote server, a playlist refresh query from the client device;
selecting, on the remote server, a new ordered set of music tracks from the qualified tracks pool based at least in part on the order, wherein the new ordered set differs at least in part from any previous ordered set; and
returning, as a reply to the playlist refresh query, a refreshed playlist based on the new ordered set of music tracks.

6. The method according to claim 1, wherein the query comprises reference to a seed music track from within the plurality of music tracks, and wherein
the input values of the input vector are determined based on the feature values of the feature vector of the seed music track; and
the input metadata record is determined based on the metadata of the seed music track.

7. The method according to claim 6, wherein the query comprises references to a plurality $n_s$ of seed music tracks arranged in an order of priority, and wherein determining the similar metadata records comprises determining, for each seed music track, a number $n_m$ of similar seed metadata records with respect to their respective input metadata record using the similarity matrix;
determining the qualified tracks pool comprises creating a seed track pool for each seed music track comprising, for each similar seed metadata record, a number $n_q$ of music tracks from the storage device which comprise the similar seed metadata record in their metadata; and
determining the order of music tracks comprises creating a number $n_s$ of master lists by sorting the music tracks from a highest priority master seed track pool based on their feature vector distances from each seed music track respectively, in descending priority order;
creating a number $n_s-1$ of secondary lists by sorting the music tracks from each of the remaining secondary seed track pools in descending priority order based on their feature vector distances from the first seed music track; and
creating a combined list by concatenating the first music tracks of each master list in descending order followed by the first music tracks of each secondary list in descending order, followed by the consecutive music tracks from each list in a similar fashion.

8. The method according to claim 6, wherein the seed music track is determined by:
creating a starter pool within the plurality of music tracks, wherein the seed music track is selected from the starter pool, and wherein the starter pool comprises music tracks based on at least one of a predetermined user taste profile,
a list of currently trending music tracks or artists,
current date or time of the client device, or
current location of the client device.

9. The method according to claim 6, wherein the input values of the input vector are determined by
providing, on a GUI, at least one gradual adjustment element movable between two end positions, the gradual adjustment element(s) graphically representing a variable associated with at least one input value of the input vector;
wherein the position of a gradual adjustment element relative to its end positions represents the value of the variable;
detecting a user interaction with at least one of the gradual adjustment elements resulting in moving the gradual adjustment element to a new position, and
determining the input values of the input vector based on the new value of the variable(s) affected by the user interaction; wherein
the gradual adjustment elements comprise at least one of a slider movable by dragging between two end points along a vertical or horizontal axis, or a rotatable knob movable by rotating clockwise or counter-clockwise between two extreme positions.

10. The method according to claim 6, wherein receiving the query comprises:
providing, on a GUI, at least one flavour element, the flavour element(s) having associated therewith at least one input vector and a reference to at least one metadata record in the similarity matrix; wherein the flavour element is one of
a textual reference to a metadata record;
a graphical or textual reference to a user ID;
a graphical reference to a location; or
a textual reference indirectly associated with at least one of the plurality of music tracks.

11. The method according to claim 10, wherein the seed music track is selected from a starter pool, the starter pool being determined based on the distances between the feature vector of each music track of the starter pool with respect to the input vector associated with at least one of the flavour elements.

12. The method according to claim 1, wherein any method step that results in a different set of music tracks than its preceding method step further involves a feedback loop to the step of determining the number $n_m$ of similar metadata records (6A), wherein in case the number N of music tracks in the resulting different set doesn't meet a threshold $N_t$, a different number $n_{s+1}$ of similar metadata records (6A) is determined, and the subsequent method steps are repeated in an iterative manner until the threshold is met.

13. The method according to claim 1, wherein the metadata comprises the artist of the respective music track;
wherein the similarity matrix comprises information about similarity between artists;
wherein the query comprises reference to a seed artist;
wherein determining the number of similar metadata records comprises determining a number $n_m$ of most similar artists with respect to the seed artist; and
wherein the qualified tracks pool comprises a number $n_q$ of qualified music tracks from each of the number $n_m$ of most similar artists.

14. A computer-implemented method for organizing music tracks, the method comprising:
providing a client device, and a storage device in data connection with the client device;
providing, on the storage device, a plurality of music tracks, each music track having linked therewith a feature vector and metadata, wherein the feature vector comprises feature values representing semantic characteristics of the respective music track, and wherein the metadata comprises at least one type of metadata record representing associated information about the respective music track;
receiving, from the client device, a query comprising natural language-based input;

analyzing the natural language-based input using a natural language processing algorithm to extract at least one keyword and at least one reference to an input metadata record;

calculating an input vector by mapping the at least one keyword to a set of input values;

selecting an ordered set of music tracks from the storage device by determining a qualified tracks pool comprising a number $n_q$ of qualified music tracks from the storage device with linked metadata record matching with the input metadata record;

determining an order of music tracks within the qualified tracks pool based at least in part on a distance between the whole or part of the feature vector of each qualified music track with respect to the input vector in the vector space; and returning to the client device, as a reply to the query, a playlist based on the ordered set of music tracks.

15. The method according to claim 14, wherein mapping the at least one keyword to a set of input values comprises applying a machine learning-based semantic algorithm trained to predict a relevance of a set of semantic characteristics for a given keyword in the form of input values.

16. The method according to claim 14, wherein mapping the at least one keyword to a set of input values comprises applying a semantic matrix defining logical relationships between a set of keywords and a corresponding set of semantic characteristics, wherein the respective values of the semantic matrix are selected as input values for a given keyword.

17. The method according to claim 14, wherein the natural language-based input comprises speech input; and wherein the method further comprises initiating audio playback, on the client device, of one of the music tracks from the playlist in response to the query.

18. The method according to claim 14, wherein the method further comprises providing a similarity matrix, the values of the similarity matrix representing a measure of similarity between different metadata records of the same type; and determining a number $n_m$ of similar metadata records with respect to the input metadata record using the similarity matrix; and wherein determining the qualified tracks pool is based on selecting, for each similar metadata record, a number $n_q$ of qualified music tracks from the storage device which comprise the respective similar metadata record in their metadata.

19. A computer program product, encoded on a non-transitory computer-readable storage medium, configured to cause a data processing apparatus to:

receive a query from a client device, the query comprising an input vector, and at least one input metadata record;

select an ordered set of music tracks from a plurality of music tracks comprised on a storage device, each music track having linked therewith a feature vector and metadata, wherein the feature vector comprises feature values representing semantic characteristics of the respective music track, and the metadata comprises at least one type of metadata record representing associated information about the respective music track, by:

determining a number $n_m$ of similar metadata records with respect to the input metadata record using a similarity matrix, the values of the similarity matrix representing a measure of similarity between different metadata records of the same type, determining a qualified tracks pool comprising, for each similar metadata record, a number $n_q$ of qualified music tracks from the storage device which comprise the respective similar metadata record in their metadata, and determining an order of music tracks within the qualified tracks pool based at least in part on a distance between the whole or part of the feature vector of each qualified music track with respect to the input vector in the vector space; and return to the client device, as a reply to the query, a playlist based on the ordered set of music tracks.

20. A computer program product, encoded on a non-transitory computer-readable storage medium, configured to cause a data processing apparatus to:

receive a query from a client device comprising natural language-based input;

analyze the natural language-based input using a natural language processing algorithm to extract at least one keyword and at least one reference to an input metadata record;

calculate an input vector by mapping the at least one keyword to a set of input values;

select an ordered set of music tracks from a plurality of music tracks comprised on a storage device, each music track having linked therewith a feature vector and metadata, wherein the feature vector comprises feature values representing semantic characteristics of the respective music track, and the metadata comprises at least one type of metadata record representing associated information about the respective music track, by determining a qualified tracks pool comprising a number $n_q$ of qualified music tracks from the storage device with linked metadata record matching with the input metadata record, and determining an order of music tracks within the qualified tracks pool based at least in part on a distance between the whole or part of the feature vector of each qualified music track with respect to the input vector in the vector space; and return to the client device, as a reply to the query, a playlist based on the ordered set of music tracks.

* * * * *